US012209426B2

(12) United States Patent
Wall et al.

(10) Patent No.: US 12,209,426 B2
(45) Date of Patent: Jan. 28, 2025

(54) PRIVACY ENCLOSURE

(71) Applicant: Spinneybeck Enterprises Inc., Getzville, NY (US)

(72) Inventors: Roger B. Wall, Buffalo, NY (US); Carl Gustav Magnusson, New York, NY (US); Joseph Cushing, III, Bethlehem, NH (US)

(73) Assignee: Spinneybeck Enterprises Inc., Getzville, NY (US)

( * ) Notice: Subject to any disclaimer, the term of this patent is extended or adjusted under 35 U.S.C. 154(b) by 172 days.

(21) Appl. No.: 17/916,831

(22) PCT Filed: Apr. 20, 2021

(86) PCT No.: PCT/US2021/028081
§ 371 (c)(1),
(2) Date: Oct. 4, 2022

(87) PCT Pub. No.: WO2021/216500
PCT Pub. Date: Oct. 28, 2021

(65) Prior Publication Data

US 2023/0151626 A1 May 18, 2023

Related U.S. Application Data

(60) Provisional application No. 63/014,297, filed on Apr. 23, 2020.

(51) Int. Cl.
*E04H 1/12* (2006.01)
*E06B 3/46* (2006.01)
*E06B 3/70* (2006.01)

(52) U.S. Cl.
CPC .......... *E04H 1/125* (2013.01); *E06B 3/4636* (2013.01); *E06B 3/7007* (2013.01)

(58) Field of Classification Search
CPC ..... E04H 1/125; E06B 3/4636; E06B 3/7007; E04B 1/84; E04B 1/10; B32B 21/14
(Continued)

(56) References Cited

U.S. PATENT DOCUMENTS 931,502 A 8/1909 Schureman
1,221,910 A 4/1917 Rutherford
(Continued)

FOREIGN PATENT DOCUMENTS

EP 2575127 A1 4/2003
GB 488970 7/1938
(Continued)

OTHER PUBLICATIONS

Pinterest Website, Proper Maintenance of Cedar Barrel Tubs—Forest Cooperage; https://www.pinterest.com/pin/vertical-sauna-front--488992472024226874/, Retrieved Oct. 3, 2022, pp. 1-2.
(Continued)

*Primary Examiner* — Paola Agudelo
(74) *Attorney, Agent, or Firm* — The Belles Group, P.C.

(57) ABSTRACT

A privacy enclosure that includes a floor plate, a ceiling assembly, and a sidewall that collectively define an interior cavity. The sidewall may have a laminate structure. The floor plate has a bottom surface and a top surface each with channels therein. The ceiling assembly includes a ceiling plate having a bottom surface with a channel therein. Portions of the sidewall may be positioned within the channel in the ceiling plate and the channel in the top surface of the floor plate. A door may be coupled to the ceiling assembly and to the floor plate. Specifically, the ceiling assembly may include a track member having a track therein and a follower member of the door may ride along the track to alter the door
(Continued)

between open and closed states. A bracket member coupled to the door may slide within the channel in the bottom surface of the floor plate.

18 Claims, 16 Drawing Sheets

(58) Field of Classification Search
USPC ............................................................... 52/64
See application file for complete search history.

(56) References Cited

U.S. PATENT DOCUMENTS

| | | | | | |
|---|---|---|---|---|---|
| 1,780,251 | A | * | 11/1930 | Teplow | E04H 1/14 D25/16 |
| 2,028,628 | A | * | 1/1936 | Sherron | E04H 1/14 49/70 |
| 2,353,045 | A | | 7/1944 | Kuntz | |
| 4,121,523 | A | | 10/1978 | Hastings | |
| 4,568,585 | A | * | 2/1986 | Kohn | B32B 21/10 428/53 |
| 4,868,936 | A | * | 9/1989 | Crocoli | B60R 15/00 4/663 |
| 4,961,294 | A | | 10/1990 | Cameron | |
| 5,117,481 | A | | 5/1992 | Sung | |
| 5,182,883 | A | | 2/1993 | Amberson et al. | |
| 5,282,341 | A | * | 2/1994 | Baloga | E04H 1/1272 52/239 |
| 5,511,348 | A | * | 4/1996 | Cornell | E04F 13/0733 52/64 |
| 5,992,095 | A | * | 11/1999 | Tilley | E05G 7/004 49/125 |
| 6,073,394 | A | * | 6/2000 | Uhl | E05F 15/641 49/358 |
| 6,180,211 | B1 | * | 1/2001 | Held | B32B 21/08 428/36.1 |
| 6,247,272 | B1 | * | 6/2001 | Shipman | E06B 3/903 49/40 |
| 6,920,650 | B2 | * | 7/2005 | Wieringa | G09F 15/0043 4/449 |
| 7,353,638 | B2 | * | 4/2008 | Salemi | E04H 1/14 379/453 |
| 7,694,479 | B2 | * | 4/2010 | Killen | E04C 2/328 52/309.4 |
| D683,864 | S | | 6/2013 | Taylor et al. | |
| 8,919,048 | B2 | | 12/2014 | Uetabira | |
| D748,281 | S | | 1/2016 | Whitman et al. | |
| 9,903,114 | B2 | | 2/2018 | Partridge et al. | |
| 10,590,671 | B1 | | 3/2020 | Jee et al. | |
| 10,626,602 | B2 | * | 4/2020 | Holbrook | E04B 2/78 |
| 2002/0046422 | A1 | | 4/2002 | Perett | |
| 2005/0016081 | A1 | * | 1/2005 | Gomree | A47B 13/04 52/36.1 |
| 2016/0356052 | A1 | | 12/2016 | Cowell | |
| 2019/0024444 | A1 | * | 1/2019 | Healey | E06B 3/7007 |
| 2019/0226447 | A1 | * | 7/2019 | Stecher | B32B 21/02 |

FOREIGN PATENT DOCUMENTS

| | | | |
|---|---|---|---|
| GB | 2574314 A | | 12/2019 |
| KR | 200429516 U | | 10/2006 |
| WO | WO2017/134341 A1 | | 8/2017 |

OTHER PUBLICATIONS

Alibaba Website, Acoustic office meeting pod /round meeting pod sofa /office telephone booth, https://www.alibaba.com/product-detail/Acoustic-office-meeting-pod-round-meeting_62413925229.html?spm=a2700.7724857.normalList.171.523167f83Ih2nA, Retrieved Oct. 4, 2022, pp. 1-1.

Office Snapshots Website, Dukta Flexible Wood from Spinneybeck, https://officesnapshots.com/products/dukta-flexible-wood/, Retrieved Oct. 3, 2022, pp. 1-1.

Poppinpod Website, Black PoppinPod Kolo 1, https://poppinpod.poppin.com/Black-PoppinPod-Kolo-1-107196+%3A+107127.html?gclid=Cj0KCQjwyPbzBRDsARIsAFh15JY96nwrtFOjcnuvpholZUmoiL-BTy5et79iB61niTOLHcaC76vO7pkaAoGoEALw_wcB, Retrieved Oct. 3, 2022, pp. 1-1.

Alibaba Website, Unique Cylindrical Design office sofa round booth office phone booth sofa, https://office-furniture.en.alibaba.com/product/62160336727-813909878/Unique_Cylindrical_Design_office_sofa_round_booth_office_phone_booth_sofa.html, Retrieved Oct. 4, 2022, pp. 1-3.

* cited by examiner

PRIVACY ENCLOSURE

BACKGROUND

In recent years, there has been an increased trend in office spaces becoming more open, meaning that they have fewer walls and private rooms and instead amount to an open space with workstations. The idea is that when there are fewer physical barriers in the office, this will result in increased collaboration. However, a problem arises when a person needs a space to make a private telephone call or work on a matter that requires the user to have complete quiet. There are soundproof booths in existence for this purpose, but currently existing soundproof booths may take up too much valuable floor space in the office, be aesthetically unappealing, or suffer from some other undesirable characteristic. Thus, a need exists for an improved privacy enclosure that provides a user in an open-style workplace with a quiet, generally soundproof space within which to perform various work functions.

BRIEF SUMMARY

The present invention is directed to a privacy enclosure that includes a housing that defines an interior space. The housing may include a floor plate, sidewalls, and a ceiling assembly that collectively define the interior space. A door may be coupled to the floor plate and the ceiling assembly to open and close an opening in the sidewall. Thus, a user may enter the interior space and then close the door to provide the user with a private space within which to perform a work function. The sidewalls may include various sound absorbing structures in order to ensure that the enclosure is generally soundproof.

In one aspect, the invention may be a privacy enclosure comprising: a floor plate having a top surface that forms a floor of an interior cavity of an enclosure, a bottom surface opposite the top surface, and an outer surface extending between the top and bottom surfaces, the top surface comprising a peripheral portion adjacent to the outer surface, the floor plate comprising a first channel in the peripheral portion of the top surface; a ceiling assembly comprising a ceiling plate have a bottom surface that forms a ceiling of the interior cavity of the enclosure, a top surface opposite the bottom surface, and an outer surface extending between the top and bottom surfaces, the bottom surface comprising a peripheral portion adjacent to the outer surface, the ceiling plate comprising a second channel in the peripheral portion of the bottom surface; a sidewall extending from a bottom end to a top end along a longitudinal axis, a bottom portion of the sidewall that comprises the bottom end disposed within the first channel of the floor plate and a top portion of the sidewall that comprises the top end disposed within the second channel of the ceiling plate so that the floor plate, the ceiling plate, and the sidewall collectively define a boundary of the interior cavity of the enclosure, the sidewall comprising a first end and a second end that extend in a direction of the longitudinal axis and are spaced apart from one another to define an opening into the interior cavity of the enclosure; and a door alterable between an open state wherein the door does not close the opening and a closed state wherein the door closes the opening.

In another aspect, the invention may be a privacy enclosure comprising: a floor plate having a top surface that forms a floor of an interior cavity of an enclosure, a bottom surface opposite the top surface, and an outer surface extending between the top and bottom surfaces, the bottom surface comprising a peripheral portion adjacent to the outer surface, the floor plate comprising a first channel in the peripheral portion of the bottom surface; a ceiling assembly comprising a ceiling plate that forms a ceiling of the interior cavity and a ring-shaped track member positioned atop of the ceiling plate, the ring-shaped track member comprising an outer surface, a channel formed into the outer surface of the ring-shaped track member that defines a track; a sidewall coupled to the floor plate and to the ceiling plate, an opening in the sidewall forming a passageway into the interior cavity of the enclosure; and a door comprising a follower member positioned within the track of the ring-shaped track member and a bracket member positioned within the first channel in the peripheral portion of the bottom surface of the floor plate, and wherein the door is alterable between an open state wherein the passageway is exposed and a closed state wherein the door closes the passageway, and wherein when altering the door between the open and closed states the follower member slides within the track and the bracket member slides within the first channel.

In yet another aspect, the invention may be a laminate structure for a sidewall of a privacy booth, the laminate structure comprising: a first layer having an inner surface that faces an internal cavity and an outer surface opposite the inner surface, the first layer formed from felt; a second layer having an inner surface that is in surface contact with the outer surface of the first layer and an outer surface opposite the inner surface, the second layer formed from an acoustic board; a third layer having an inner surface that is in surface contact with the outer surface of the second layer and an opposite outer surface, the third layer formed from plywood; and a fourth layer having an inner surface that faces the outer surface of the third layer and an opposite outer surface, the fourth layer formed from felt.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
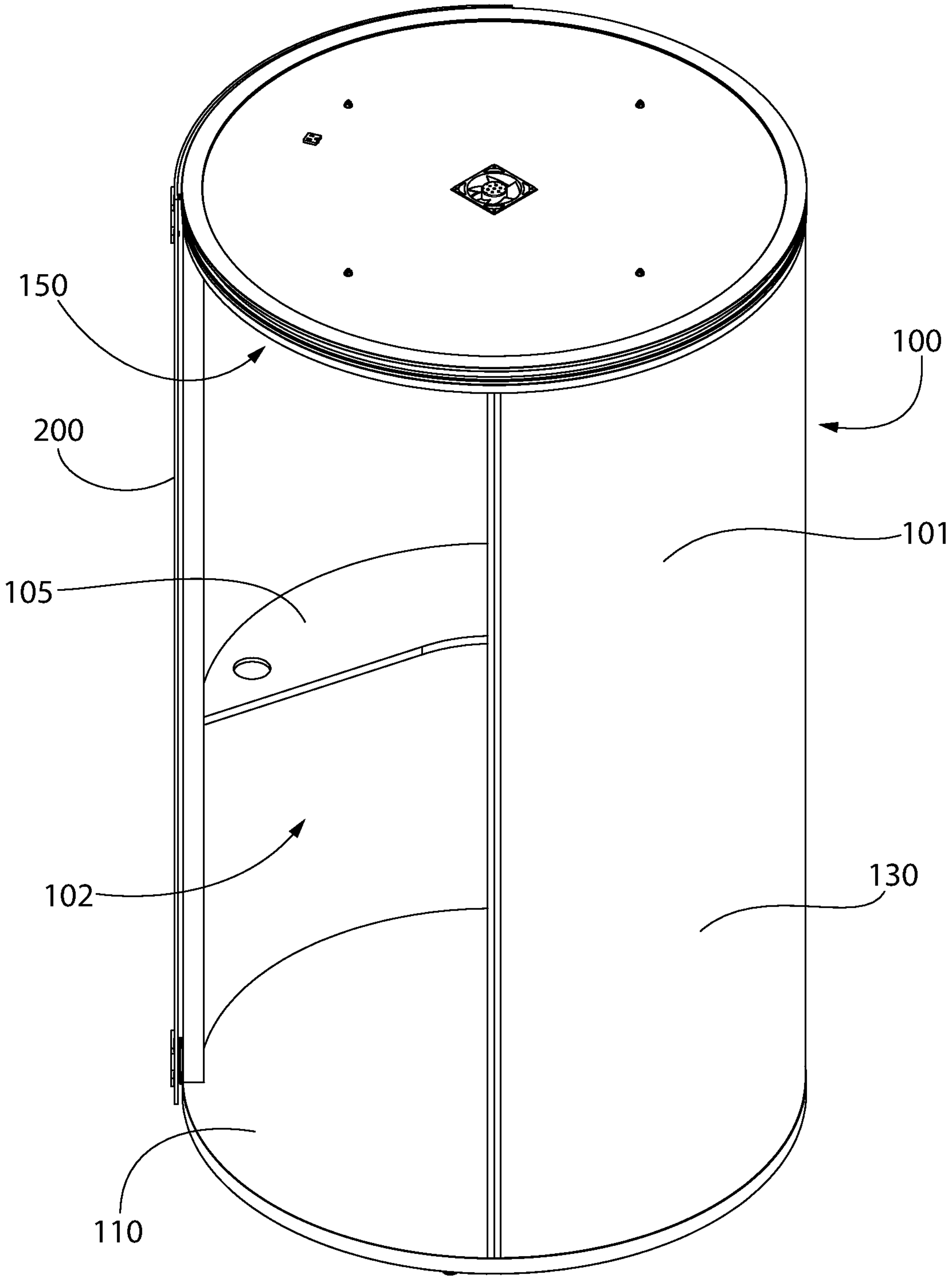
FIG. 1 is a front perspective view of a privacy enclosure in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
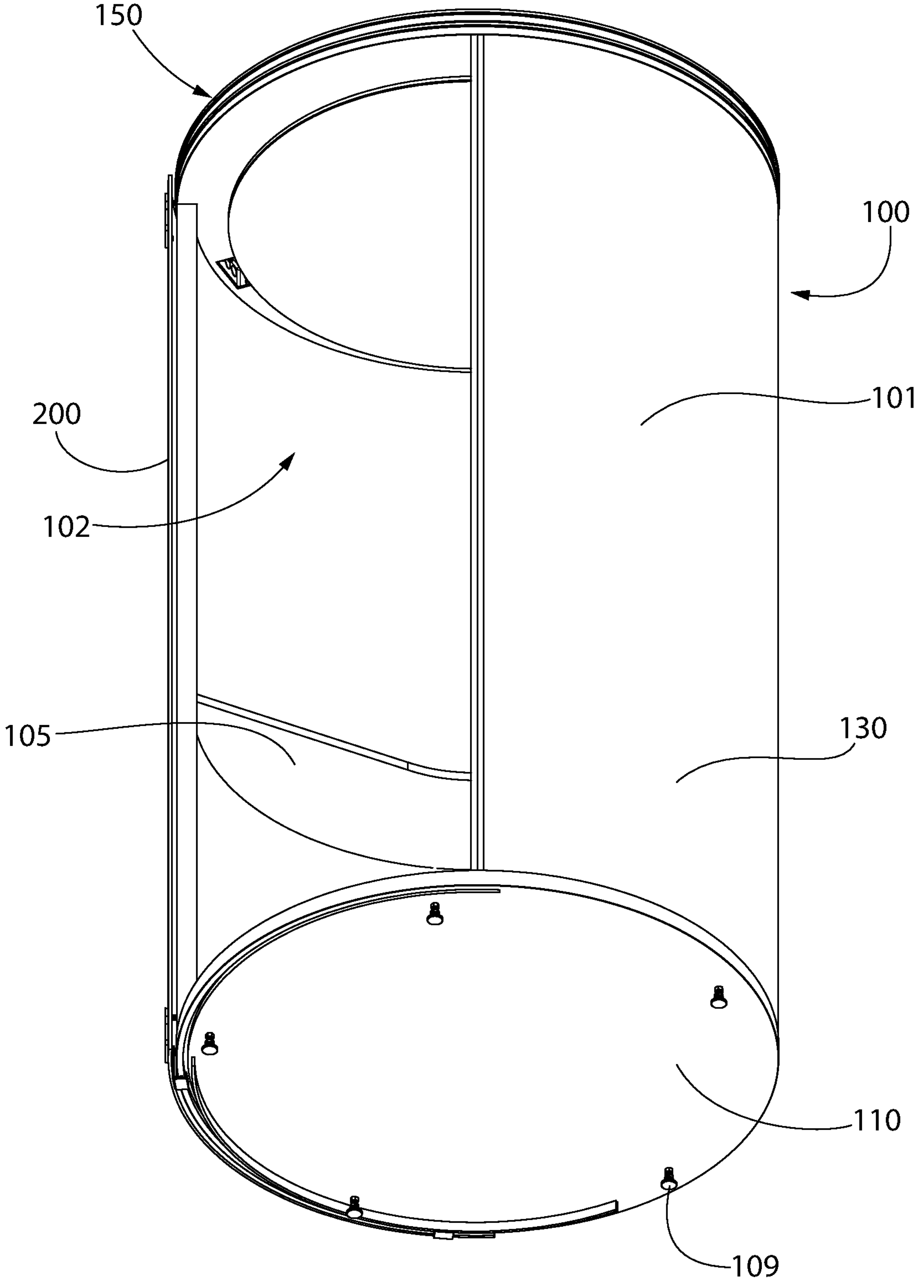
FIG. 2 is a rear perspective view of the privacy enclosure of FIG. 1.

Referring to FIGS. 1 and 2, a privacy enclosure (hereinafter "the enclosure") 100 is illustrated in accordance with an embodiment of the present invention. The enclosure 100 is a housing 101 that comprises an internal cavity 102 that is large enough for one or more persons to stand or sit in while being isolated from the exterior environment. Thus, a person can walk into the internal cavity 102 of the enclosure 100, close a door of the enclosure 100, and be completely separated from persons on the other side of the enclosure 100. This provides a space for the person to conduct work, including making and receiving telephone calls, without being disrupted by outside factors or noises and without that person's communications being heard by people outside of the enclosure 100. Specifically, the enclosure 100 is designed to be generally soundproof meaning that a person inside of the internal cavity 102 will not hear most (or perhaps any) sounds being made from the area outside of the housing 101. Similarly, persons outside of the housing 101 will not hear sounds being made by the person or persons standing or sitting inside of the internal cavity 102. Thus, a user can make a telephone call or a group of persons could have a private conversation within the internal cavity 102 of the enclosure 100 without concern that others may also hear the conversation. The enclosure 100 is designed to be free-standing such that it can be assembled and positioned on a floor in an office space or the like while creating a soundproof chamber (i.e., the internal cavity 102) for a user to go for privacy as described herein.

The enclosure 100 generally comprises a floor plate 110, a sidewall 130, and a ceiling assembly 150 that are coupled together. Furthermore, a door 200 is coupled to the floor plate 110 and to the ceiling assembly 150 to allow and prevent entrance into the interior cavity 102. In the exemplified embodiment, a shelf or desk 105 is coupled to the sidewall 130 and positioned within the interior cavity 102. The shelf 105 provides a surface upon which a user may place his/her belongings such as papers, files, computers, telephones, or the like while the user is in the internal cavity 102 of the enclosure 100. The shelf 105 may comprise a cup holder 147 formed as a recess in the upper surface of the shelf 105. The shelf 105 may also comprise a power source 148 for charging an electronic device such as a laptop.

In the exemplified embodiment, the enclosure 100 is cylindrical shaped. Thus, the floor plate 110 is round, the components of the ceiling assembly 150 are round or ring-shaped, and the sidewall 130 is curved. Thus, in one preferred embodiment of the present invention the enclosure 100 is in the shape of a cylinder. Of course, in alternative embodiments the enclosure 100 could take on other shapes including being square, rectangular, triangular, or the like. In the exemplified embodiment, the enclosure 100 may have a diameter between 40 inches and 60 inches, and more specifically between 45 inches and 50 inches, although the enclosure 100 could be increased or decreased in size as need for a particular application or use.

Figure 3:
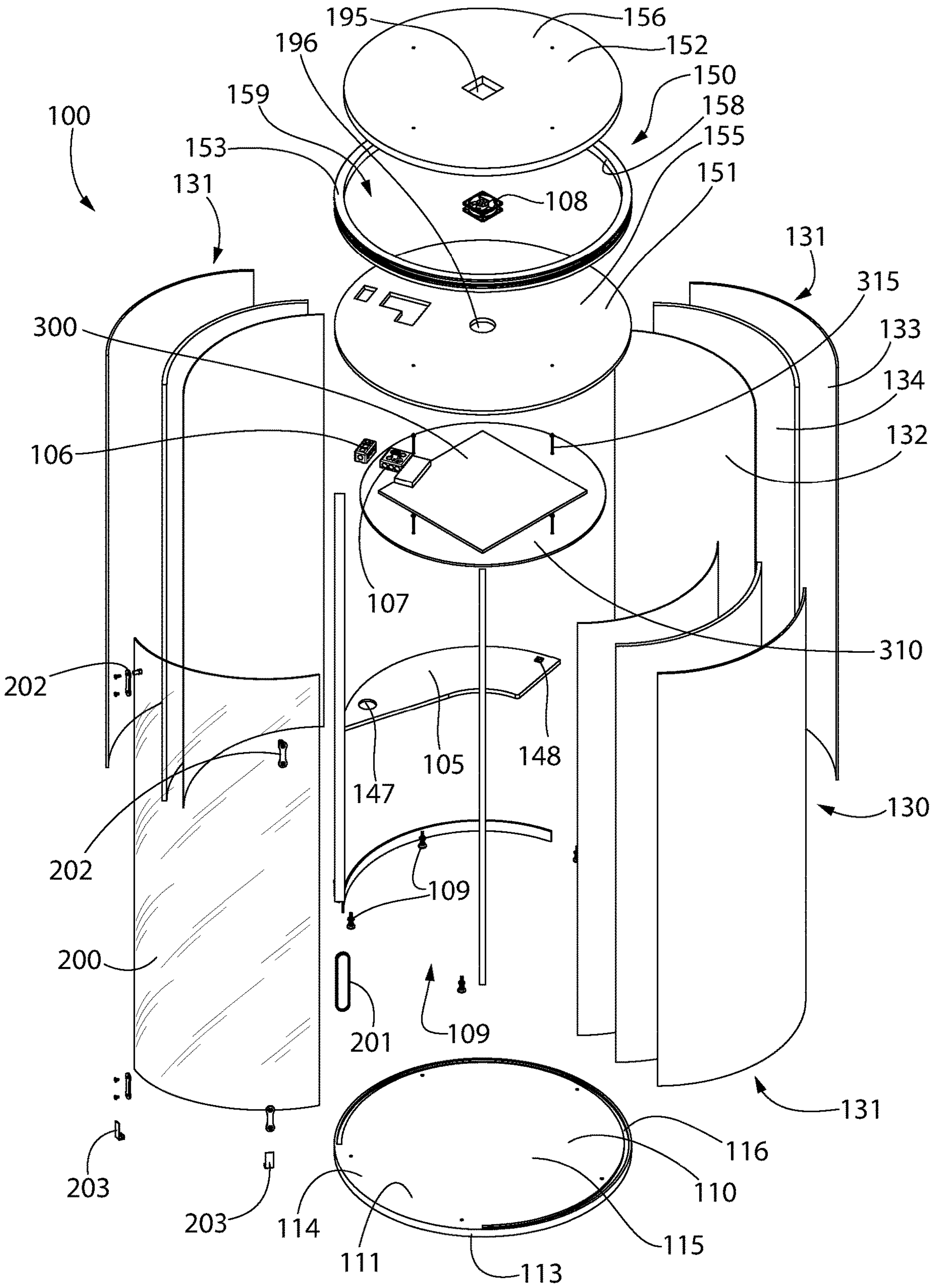
FIG. 3 is a front perspective exploded view of the privacy enclosure of FIG. 1.
Figure 4:
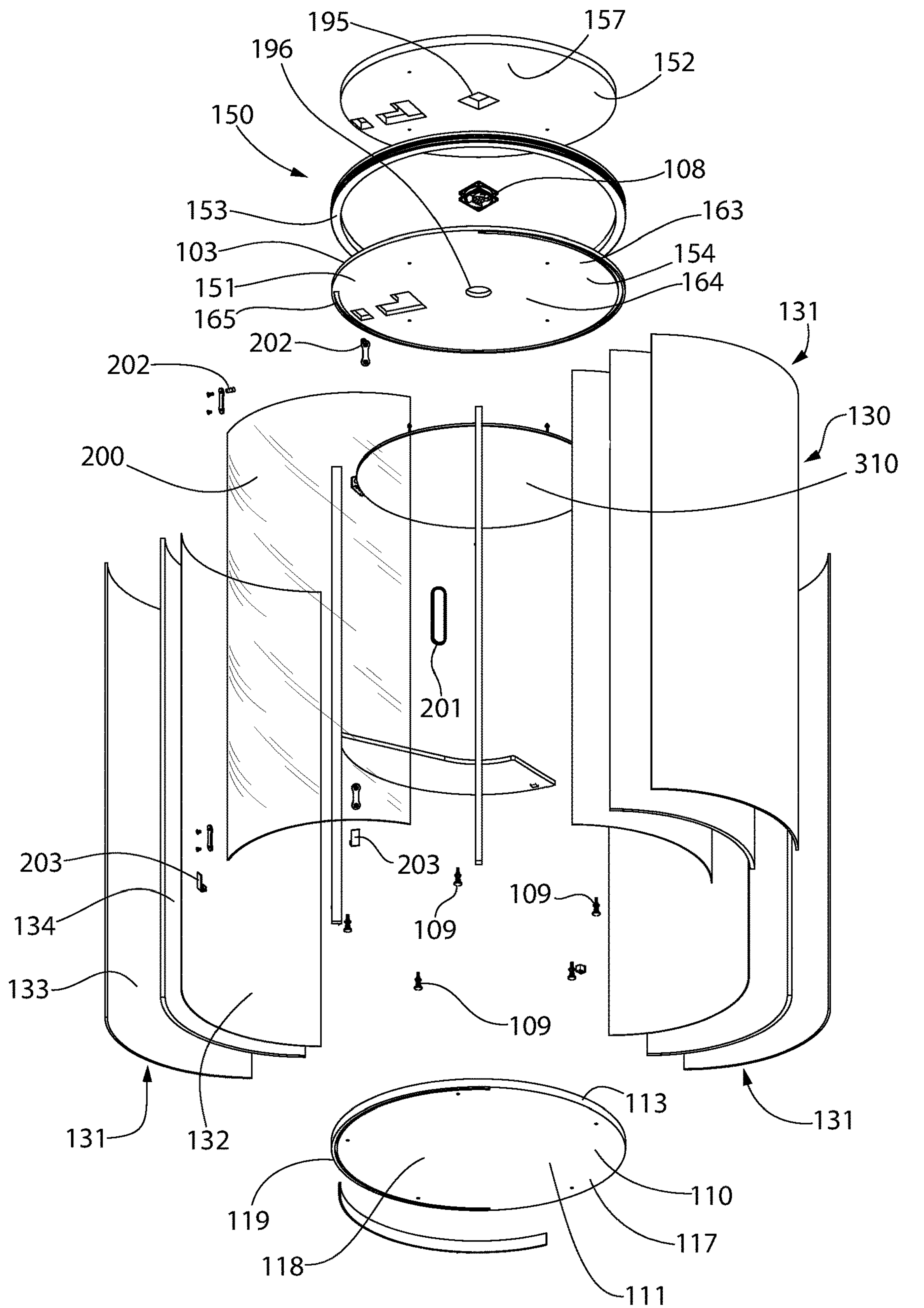
FIG. 4 is a rear perspective exploded view of the privacy enclosure of FIG. 1.

Referring to FIGS. 3 and 4, the components of the enclosure 100 will be described in greater detail. Specifically, the various parts that make up the enclosure 100 will be mentioned with regard to FIGS. 3 and 4, and it should be appreciated that some of the components and parts will be described in greater detail along with the figures that follow.

As mentioned above, the enclosure 100 comprises the floor plate 110, the sidewall 130, the ceiling assembly 150, the door 200, and the shelf 105. The floor plate 110 comprises a top surface 111, a bottom surface 112, and an outer surface 113 extending between the top and bottom surfaces 111, 112. The outer surface 113 forms an outer periphery of the floor plate 110. The floor plate 110 is generally a flat, planar plate-like structure that forms a floor of the internal cavity 102 when the enclosure 100 is fully assembled. Thus, the top and bottom surfaces 111, 112 are planar and parallel to one another. Furthermore, the top surface 111 of the floor plate 110 forms the floor of the internal cavity 102 of the enclosure 100 upon which a user stands or rests his/her feet when located in the enclosure 102.

In the exemplified embodiment, the sidewall 130 comprises three arcuate wall segments 131 that are positioned in an end-to-end adjacent manner in the assembled enclosure such that the three arcuate wall segments 131 collectively form the sidewall 130. Of course, depending on the size and shape of the enclosure 100, the number of wall segments 131 and their shape can be modified. Thus, because the enclosure 100 is cylindrical in the exemplified embodiment, the wall segments 131 are arcuate or curved so that inner surfaces of the wall segments 131 that face the internal cavity 102 are concave and outer surfaces of the wall segments 131 that face away from the internal cavity 102 (and perhaps form an exposed outer surface of the sidewall 130 in some embodiments) are convex. Furthermore, in the exemplified embodiment each of the wall segments 131 comprises a laminate structure comprising an inner layer 132, an outer layer 133, and a central layer 134 disposed between the inner and outer layers 132, 133. The inner layer 132 faces and directly bounds the internal cavity 102 of the enclosure 100 and the outer layer 133 faces the exterior. The outer layer 133 may form an exposed outer surface of the enclosure 100 in some embodiments, although in other embodiments another exterior layer may be coupled to the outer layer 133 to form the exposed outer surface of the enclosure 100, one example of which will be described below with reference to FIGS. 13 and 14. The determination of whether or not to include an additional exterior layer depends on a desired exterior aesthetic and may be customized in some embodiments. Additional details of the various layers including their materials of construction, thickness, and the like will be provided below with reference to FIG. 10.

The ceiling assembly 150 forms a ceiling of the internal cavity 102, a roof of the enclosure 100, and a track upon which the door 200 is configured to move between open and closed states or positions. Thus, the ceiling assembly 150 comprises a ceiling plate 151, a roof plate 152, and a track member 153. The ceiling plate 151 is a flat, plate-like structure having a bottom surface 154 that faces the internal cavity 102 and forms a ceiling of the internal cavity 102 and a top surface 155 opposite the bottom surface 154. Furthermore, the ceiling plate 151 has an outer surface 103 that extends between the top and bottom surfaces 154, 155 and forms an outer periphery of the ceiling plate 151. The roof plate 152 comprises a top surface 156 that forms an exposed roof of the enclosure 100 and a bottom surface 157 opposite the top surface 156. The track member 153 has an inner surface 158 that defines a through-hole 159 within which the roof plate 152 is positioned when the enclosure is assembled. Thus, in the exemplified embodiment the track member 153 is in the shape of a ring and the ceiling and roof plates 151, 152 are circular shaped or round shaped plates. The track member 153 may be formed from metal such as aluminum or stainless steel in some embodiments, although other materials including wood, plastic, or the like could also be used. The ceiling plate 151 and the roof plate 152 also include various openings for receiving junction boxes 106, power input units 107, and fan devices 108.

The enclosure 100 also comprises a light source 300 and a diffuser plate 310. The light source 300 is coupled to the diffuser plate 310 and the diffuser plate 310 is coupled to the ceiling assembly 150, as will be described in greater detail below with reference to FIG. 9. The diffuser plate 310 is a light diffuser such that the diffuser plate 310 forms a light scattering medium that is placed in the path of the light source 300 to soften the lighting in the internal cavity 102. The light source 300 may be any type of light source including incandescent bulbs, fluorescent bulbs, halogen bulbs, light emitting diodes, or other types of light generating devices now known or later discovered.

The door 200 is a transparent structure that may be formed from glass, clear polycarbonate material, clear acrylic, or the like. The door 200 comprises a handle 201 to enable a user to easily open and close the door 200. Furthermore, the door 200 comprises a pair follower members 202 (although one or more than two follower members could be used in other embodiments) that rides along a track of the track member 153 as described in greater detail below. The door 200 also comprises a pair of bracket members 203 (although one or more than two bracket members could be used in other embodiments) that rides along a channel in the bottom surface 112 of the floor plate 110 as will be described in greater detail below.

The enclosure 100 also includes a plurality of support legs 109 that are coupled to and extend from the bottom surface 111 of the floor plate 110 to support the enclosure 100 on a desired ground surface. Thus, the support legs 109 support the enclosure so that the bottom surface 111 of the floor plate 110 is elevated above the ground, which allows for the mounting bracket 203 of the door 200 to slide within the channel in the bottom surface 111 of the floor plate 110 as mentioned above and described in greater detail below.

Figure 5:
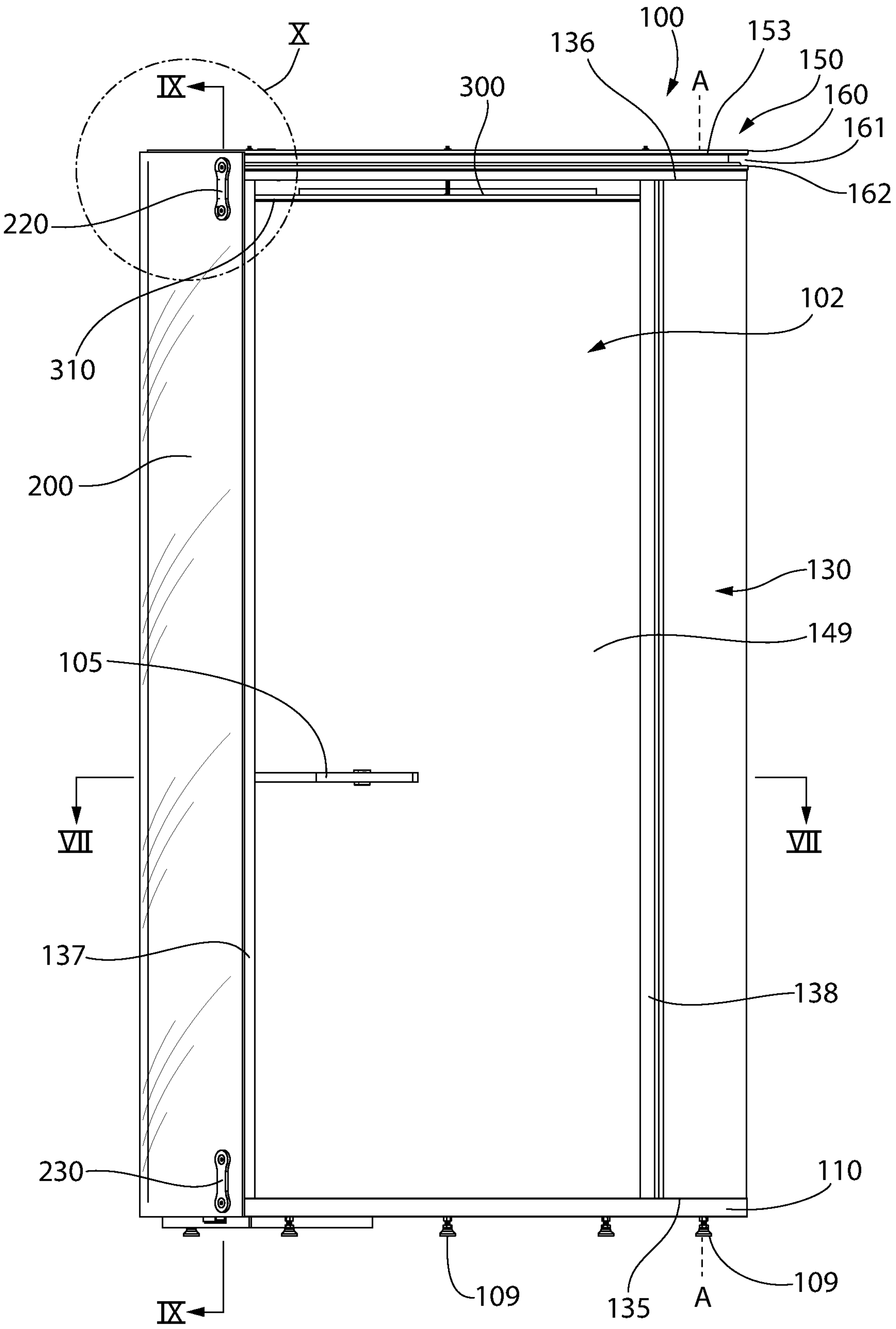
FIG. 5 is a front view of the privacy enclosure of FIG. 1, with a door of the privacy enclosure in an open state.
Figure 6:
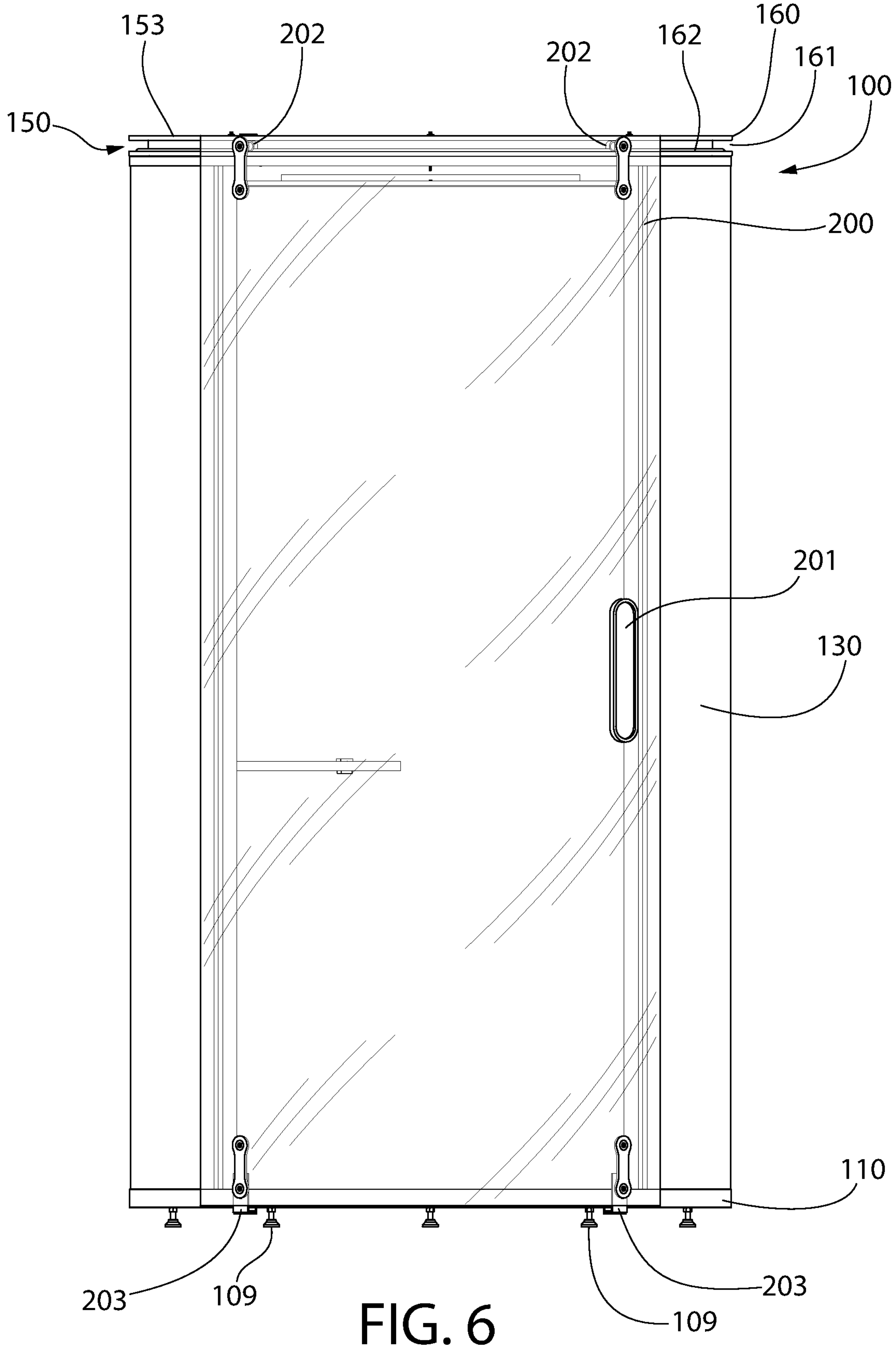
FIG. 6 is the front view of FIG. 5 with the door of the privacy enclosure in a closed state.

FIGS. 5 and 6 are front views of the enclosure 100. In FIG. 5, the door 200 is open and in FIG. 6 the door 200 is closed. Thus, there is an opening 149 in the sidewall 130 that can be closed by the door 200 by sliding the door 200 between the open state shown in FIG. 5 and the closed state shown in FIG. 6. When in the closed state, the door 200 closes the opening 149, thereby proving the user with complete privacy. As noted above, in some embodiments the door 200 is transparent so persons outside of the enclosure 100 can still see into the enclosure. However, in other embodiments the door 200 may not be fully transparent to limit a person's ability to see into the internal cavity 102. Thus, the door 200 may be translucent in some embodiments, the door 200 may be a gradient of light transmissivity such that it is less light transmissive in portions that are aligned with a user who is in the enclosure 100 and more light transmissive in areas that are not aligned with a user who is in the enclosure 100. In still other embodiments, the door 200 may be opaque to completely prevent someone outside of the enclosure 100 from seeing into it when the door 200 is closed. The sidewall 130 may include a window in some embodiments.

Figure 10:
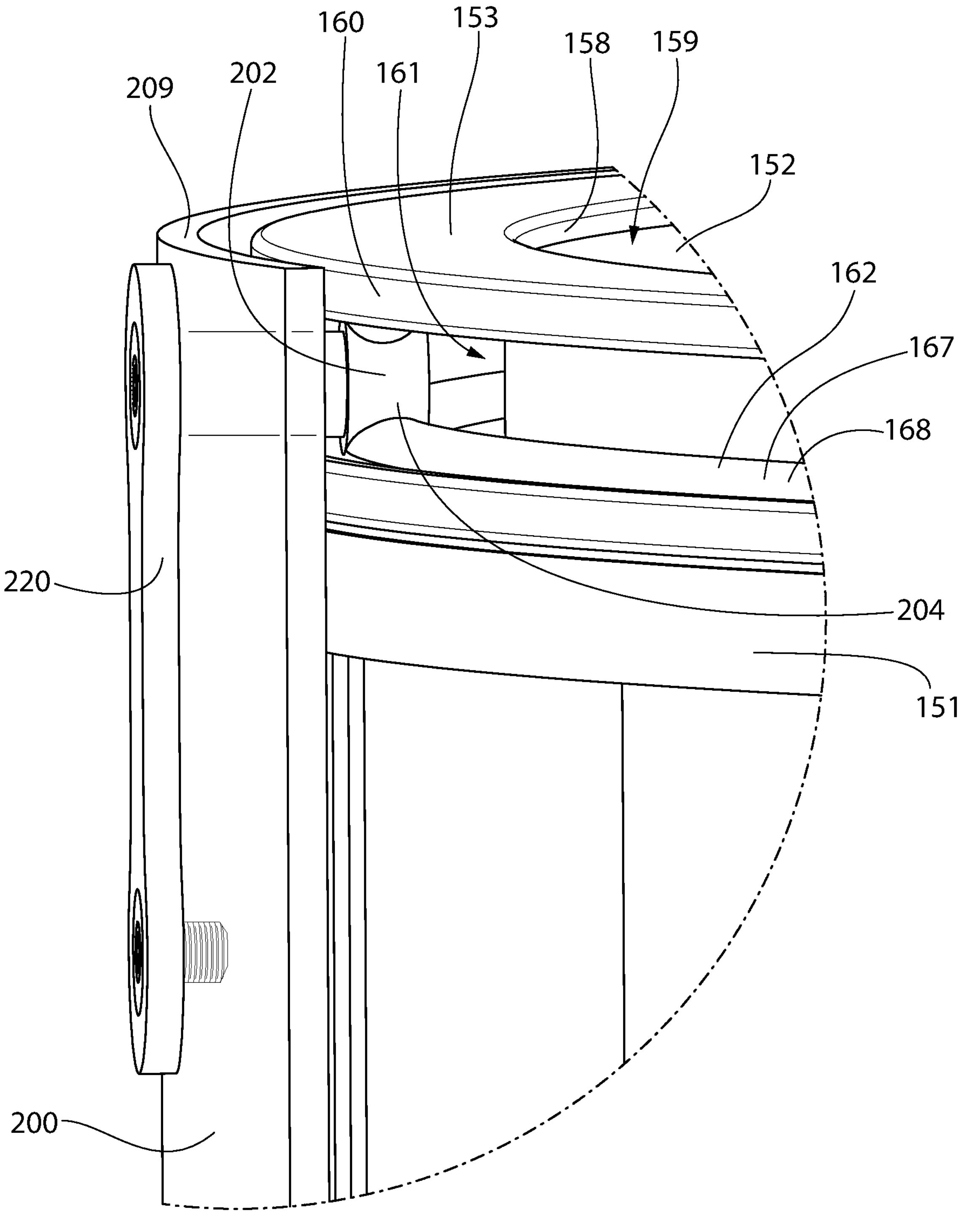
FIG. 10 is a close-up view of area X of FIG. 5 viewed from a different perspective.

As seen in FIGS. 5 and 6 and described in more detail below with reference to FIGS. 10 and 11, the track member 150 comprises an outer surface 160 having a channel 161 therein, with the channel 161 forming a track 162 for the follower members 202 of the door 200. Thus, as the door 200 moves from the open state to the closed state (and vice versa), the follower members 202 of the door 200 slide within the track 162 of the track member 150. In some embodiments, the follower members 202 may be rollers that roll along the track 162 of the track member 150.

Figure 7:
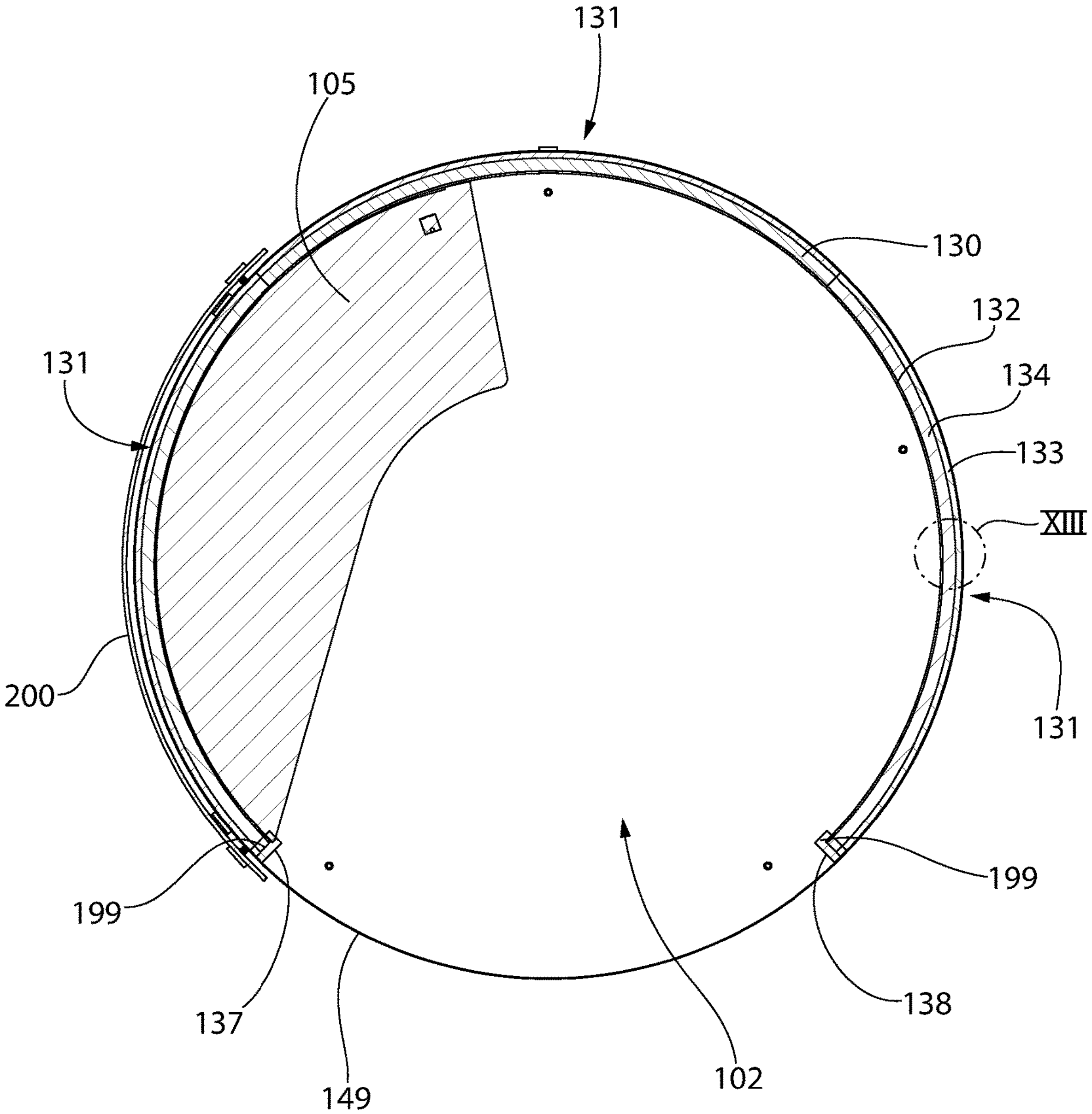
FIG. 7 is a cross-sectional view taken along line XII-XII of FIG. 5.

FIG. 7 is a transverse cross-sectional view taken through the enclosure 100. The shelf 105 and its coupling to the inner surface of the sidewall 130 can be seen. Specifically, in the exemplified embodiment the shelf 105 extends along and is coupled to two of the three wall segments 131 of the sidewall 130. Of course, the shelf 105 could be coupled to and extend along only one of the wall segments 131 in some alternative embodiments or the shelf 105 could be coupled to and extend along all three of the wall segments 131 in other embodiments. In FIG. 7, the door 200 is in the open state and the opening 149 is exposed.

Referring to FIGS. 5 and 7 concurrently, the sidewall 130 extends from a bottom end 135 to a top end 136 along a longitudinal axis A-A (it should be noted that although the bottom and top ends 135, 136 are labeled in FIG. 5, the ends of the sidewall 130 are actually concealed by the floor plate 110 and the ceiling assembly 150 as shown and described in greater detail below with reference to FIGS. 9, 11, and 12). Furthermore, the sidewall 130 comprises a first end 137 and a second end 138. The sidewall 130 extends circumferentially from the first end 137 to the second end 138 around the interior cavity 102 of the enclosure 100. Of course, if the enclosure 100 were to have a different shape which is not curved, the sidewall 130 may extend in a manner that is other than circumferentially such as transversely or the like. The first and second ends 137, 138 are edges of the sidewall 130 that are elongated in a direction parallel to the longitudinal axis A-A. The first and second ends 137, 138 are spaced apart from one another, and the opening 149 is located between the first and second ends 137, 138. The first and second ends 137, 138 may be formed by end caps 199 that are coupled to the ends of the sidewall 130 to provide a more seamless appearance. In the exemplified embodiment whereby the enclosure 100 is cylindrical, the first and second ends 137, 138 are circumferentially spaced apart from one another. Regardless, the opening 149 is defined by the space between the first and second ends 137, 138 of the sidewall 130.

Figure 8:
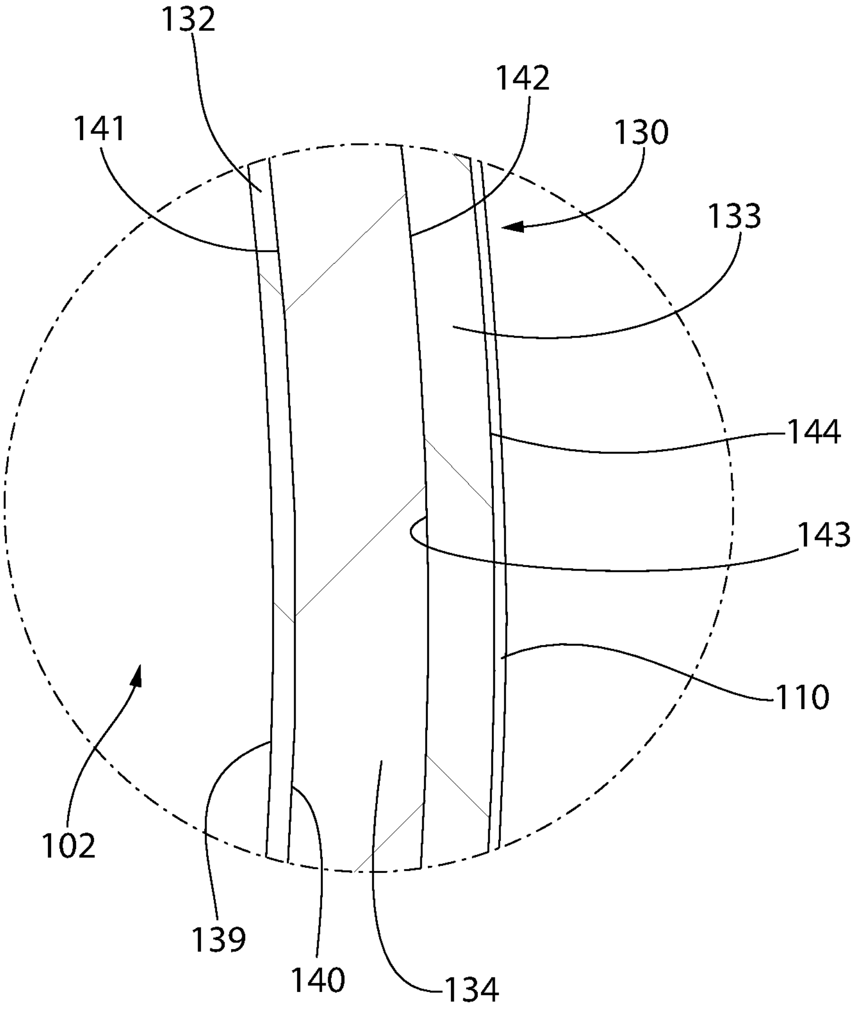
FIG. 8 is a close-up view of area VIII of FIG. 7.

Referring to FIGS. 7 and 8, the laminate structure of the sidewall 130 (and of each of the wall segments 131 of the sidewall 130 accordingly) will be described. As noted above, the sidewall 130 comprises the laminate structure which comprises the inner layer 132, the outer layer 133, and the central layer 134. The inner layer 132 comprises an inner surface 139 and an outer surface 140, the central layer 134 comprises an inner surface 141 and an outer surface 142, and the outer layer 133 comprises an inner surface 143 and an outer surface 144. The inner surface 139 of the inner layer 139 forms an inner surface of the sidewall 130 which faces and bounds the internal cavity 102. The outer surface 140 of the inner layer 132 is in surface contact with the inner surface 141 of the central layer 134. The outer surface 141 of the central layer 134 is in surface contact with the inner surface 143 of the outer layer 133. The outer surface 144 of the outer layer 133 forms the exposed outer surface of the sidewall 130 in the exemplified embodiment.

In the exemplified embodiment, the inner layer 132 is felt, and more particularly wool felt. Similarly, the outer layer 133 is felt, and more particularly wool felt. In some embodiments, the inner and outer layers 132, 133 may be formed from 100% wool felt. Thus, the inner and outer layers 132, 133 may be formed from the same material. In some embodiments, the inner and outer layers 132, 133 may comprise the same color, pattern, or the like for aesthetic consistency. In other embodiments, the inner and outer layers 132, 133 may comprise different colors, patterns, or the like to achieve a different aesthetic on the interior and exterior of the enclosure 100. The inner and outer layers 132, 133 may be adhered to the central layer 134 using any of a variety of different techniques, including adhesives such as glue or tape, staples, nails, screws or other fasteners, or the like.

The central layer 134 may be an acoustic board, which can be a board formed of a rigid material that comprises an acoustic infill. Thus, the acoustic board may include outer walls that define a cavity that is filled with sound absorbing material. The outer walls may be porous so that sound can pass through the outer walls and into the sound absorbing material. Of course, other materials of construction may be used for the central layer as desired depending on acoustic requirements, structural rigidity requirements, or the like. In some embodiments, the central layer 134 may be formed from or may comprise plywood, medium-density fiberboard (MDF), or the like. The central layer 134 can be formed of other materials in other embodiments, such as wood, plastic, metal, or the like. However, it is preferable that the central layer 134 be formed from a rigid material because the central layer 134 forms the main structure of the enclosure 100.

In the exemplified embodiment, the inner layer 132 has a thickness that is between 2 mm and 4 mm, and more specifically approximately 3 mm. The outer layer 133 has a thickness between 8 mm and 12 mm, and more specifically approximately 10 mm. The central layer 134 may have a thickness between 15 mm and 25 mm, and more specifically approximately 20 mm. In other embodiments, the central layer 134 may have a thickness of between 8 mm and 12 mm, and more specifically approximately 10 mm. The sidewall 130 forms an acoustic barrier in that it absorbs sound that is generated from either inside or outside of the enclosure 100 to enhance the acoustic privacy to a person that is inside of the enclosure 100.

Figure 8A:
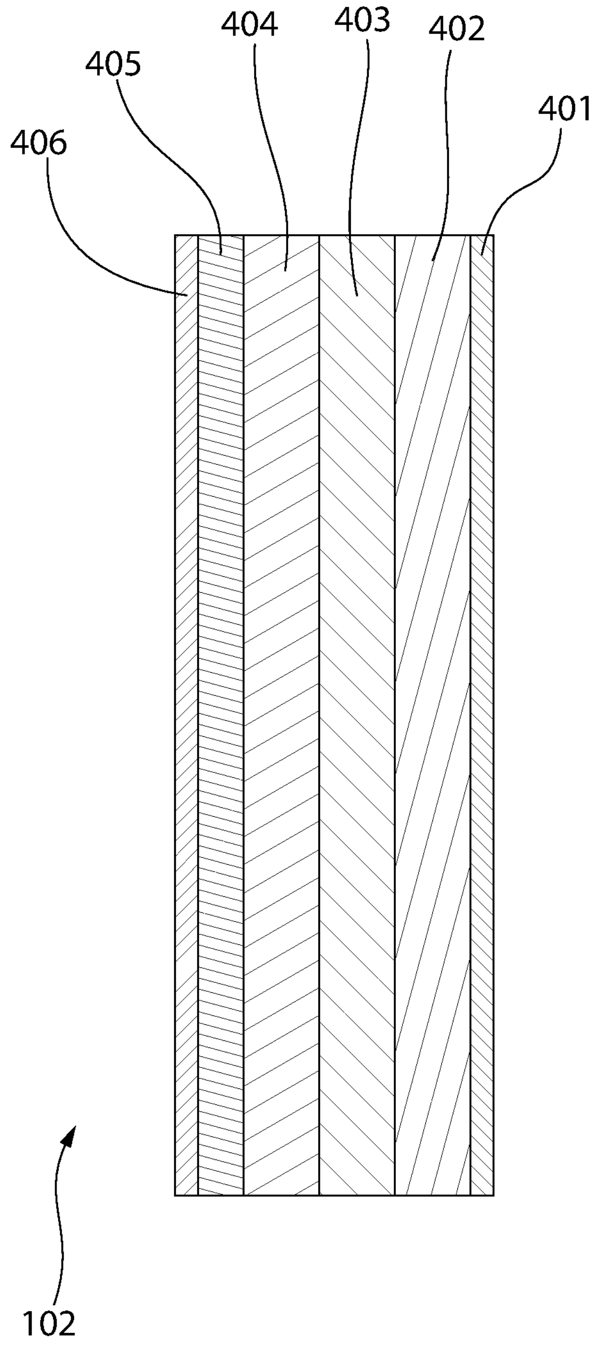
FIG. 8A is a close-up view of area VIII of FIG. 7 in accordance with another embodiment.

Referring to FIG. 8A, one specific laminate structure of the sidewall 130 will be described. In FIG. 8A, the internal cavity 102 is labeled so it is easy to determine which layer forms the inner surface of the sidewall 130 and which layer forms the outer surface of the sidewall 130. In this embodiment, the sidewall 130 comprises, moving from the outermost surface to the innermost surface (with the innermost surface facing the internal cavity 102) a sixth layer 401, a fifth layer 402, a fourth layer 403, a third layer 404, a second layer 405, and a first layer 406. Each layer 401-406 may be in intimate surface contact with the one or two layers to which it is adjacent. It should be appreciated that the numerical prefixes for each of the layers may not be used consistently in the claims as compared to the specification and drawings because the numerical prefix used in the claims depends on claim structure and the point within the claim that each layer is introduced.

In this embodiment, the sixth layer 401 may be formed from felt, such as 100% wool felt. The sixth layer 401 may have a thickness of between 2 mm and 4 mm, and more specifically approximately 3 mm. The fifth layer 402 may be an acoustic board. The fifth layer 402 may have a thickness of between 8 mm and 12 mm, and more specifically approximately 10 mm. The fourth layer 403 may be plywood. For example, the fourth layer 403 may be a layer of bending plywood having a thickness of approximately between 8 mm and 12 mm, and more specifically approximately 9.5 mm. The third layer 404 may be identical to the fourth layer 403. Thus, the third layer 404 may be another layer of bending plywood having a thickness between 8 mm and 12 mm, and more specifically approximately 9.5 mm. In some embodiments, the third and fourth layers 403, 404 may be combined and formed from a single layer of bending plywood having a thickness between 16 mm and 24 mm, and more specifically approximately 19 mm. In some embodiments, the third and fourth layers 403, 404 may have a combined thickness of from about ⅛ inch to about ½ inch, and more specifically approximately ⅜ inch. In some embodiments, the plywood layer may be deemed a single layer formed from two sub-layers. This may be done because plywood is easier to bend the smaller the thickness. Thus, by forming two sub-layers that are adjacent to one another, the plywood can be bent into the desired arcuate shape for the sidewall 130 which is round/arcuate as described herein. The second layer 405 may be an acoustic board. The second layer 405 may have a thickness between 4 mm and 8 mm, and more specifically approximately 6 mm. Finally, the first layer 406 may be formed from felt, such as 100% wool felt. The first layer 406 may have a thickness of between 2 mm and 4 mm, and more specifically approximately 3 mm.

As noted above, in the exemplified embodiment the first layer 406 and the sixth layer 401 comprise felt. In other embodiments, the first and sixth layers 406, 401 may comprise a textile, and the textile may comprise felt. In some embodiments, the felt may comprise a natural fiber, a synthetic fiber, or a combination thereof. In some embodiments, the natural fiber may comprise a wool. In some embodiments, the synthetic fiber may comprise a petroleum-based acrylic, acrylonitrile, a wood pulp-based rayon, or a combination thereof.

The sixth layer 401 may be coupled to the fifth layer 402 using an adhesive, the fifth layer 402 may be coupled to the fourth layer 403 using liquid nails, the fourth layer 403 may be coupled to the third layer 404 using wood glue, the third layer 404 may be coupled to the second layer 405 using liquid nails, and the second layer 405 may be coupled to the first layer 406 using adhesive (e.g., Simalfa 309 adhesive). As can be seen in FIG. 8A, there are no air gaps in the laminate structure of the sidewall 130. Rather, each layer is in intimate surface contact with the one or two layers that is/are adjacent to that layer.

The laminate structure of the sidewall 130 may provide a noise reduction coefficient (NRC) of at least about 0.3, 0.4, 0.5, 0.6, 0.7, 0.8, 0.9, or 0.95 in various different embodiments. In some specific embodiments, the laminate structure of the sidewall 130 may provide a noise reduction coefficient of at least 0.5. Thus, the sidewall 130 absorbs sounds, thereby rendering the enclosure 100 soundproof, or at least partially soundproof, so that sounds made inside of the enclosure 100 are not heard outside of the enclosure 100 and sounds made outside of the enclosure 100 are not made inside the enclosure 100.

Figure 9:
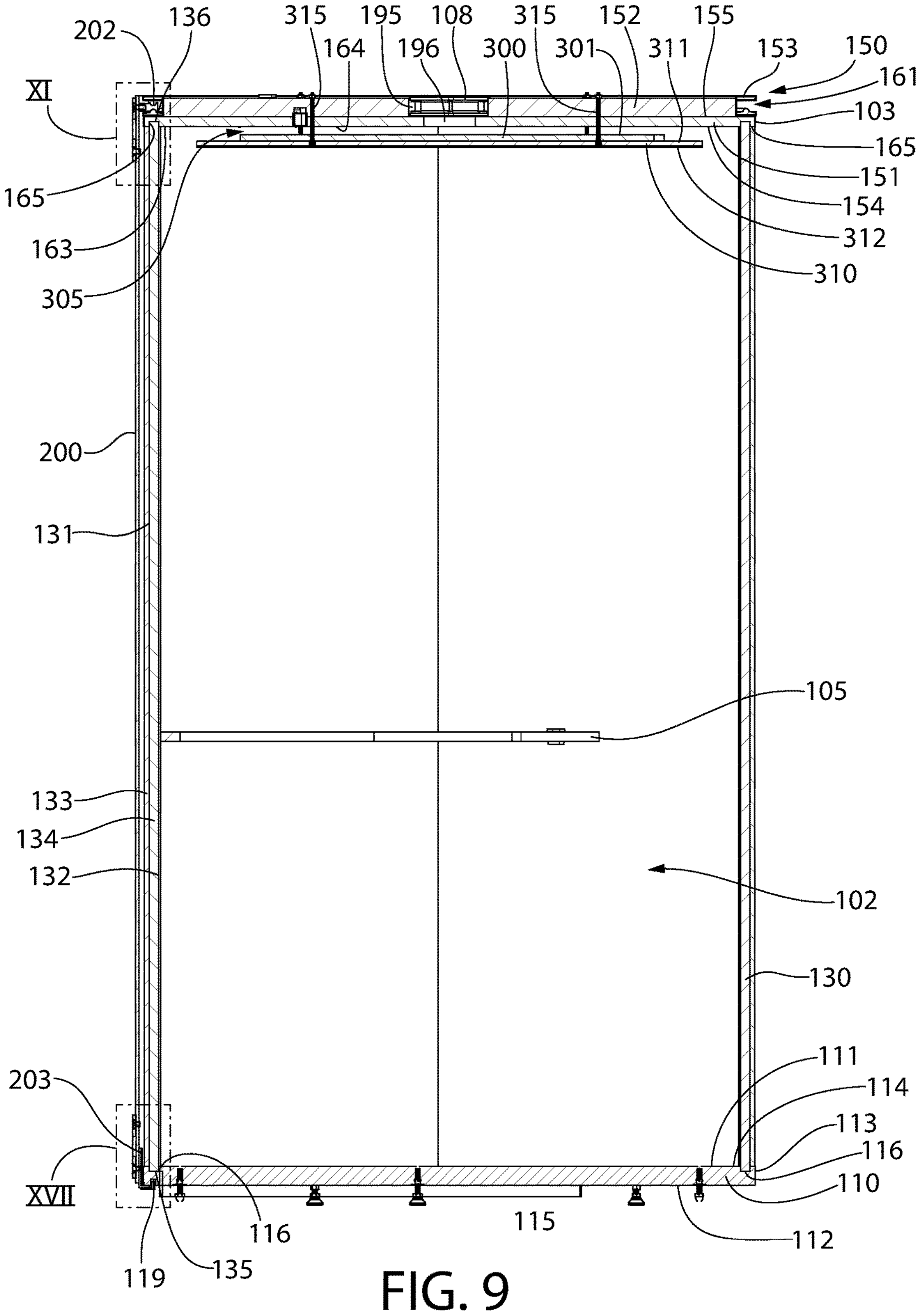
FIG. 9 is a cross-sectional view taken along line IX-IX of FIG. 5

Referring to FIGS. 3, 4, and 9, features of the components of the enclosure 100 that facilitate assembly of the enclosure 100 and holding of the various components of the enclosure 100 together will be described in greater detail. The top surface 111 of the floor plate 110 comprises a peripheral portion 114 that is adjacent to the outer surface 113 and a central portion 115 that is surrounded by the peripheral portion 114. In the exemplified embodiment because the floor plate 110 is round, the peripheral portion 114 is a ring-shaped portion of the top surface 111 of the floor plate 110 that surrounds the central portion 114. A first channel 116 is formed into a portion of the peripheral portion 114 of the top surface 111 of the floor plate 110. That is, the first channel 116 does not extend along an entirety of the ring-shaped peripheral portion 114 in the exemplified embodiment. Rather, in the exemplified embodiment the first channel 116 extends approximately 270° around the peripheral portion 114 of the top surface 111 of the floor plate 110. Thus, the first channel 116 is located along a first portion of the peripheral portion 114 of the top surface 111 of the floor plate 110 while a second portion of the peripheral portion 114 of the top surface 111 of the floor plate 110 remains free or devoid of the first channel 116 (or any channel for that matter). The first channel 116 is intended to support the sidewall 130, and because the sidewall 130 does not extend along an entire circumference of the enclosure 200 (due to the need for the opening 149), the first channel 116 also does not need to extend along the entire circumference of the enclosure. Of course, in other embodiments it would be possible for the first channel 116 to form a closed loop such that it extends around the entire peripheral portion 114. The first channel 116 is positioned immediately adjacent to the outer surface 113 of the floor plate 110 such that only a very small annular portion of the top surface 111 exists between the first channel 116 and the outer surface 113.

As noted above, the ceiling plate 151 of the ceiling assembly 150 comprises a bottom surface 154 that forms a ceiling of the internal cavity 102 and a top surface 155 opposite the bottom surface 154. The bottom surface 154 comprises a peripheral portion 163 adjacent to the outer surface 103 that surrounds a central portion 164. In the exemplified embodiment whereby the ceiling plate 151 is circular or round as noted herein, the peripheral portion 163 is ring-shaped and it surrounds the central portion 164. A second channel 165 is formed into the bottom surface 154 of the ceiling plate 151 along at least a portion of the peripheral portion 163. Similar to the first channel 116, the second channel 165 is formed into a first portion of the peripheral portion 163 and a second portion of the peripheral portion 163 is free or devoid of any channel. In the exemplified embodiment, the second channel 165 also extends approximately 270° around the ceiling plate 151, although the invention is not to be limited by this in all embodiments and the second channel 165 could extend a full 360° in other embodiments. The second channel 165 is intended to support the sidewall 130, and because the sidewall 130 does not extend along an entire circumference of the enclosure 200 (due to the need for the opening 149), the second channel 165 also does not need to extend along the entire circumference of the enclosure 100 in the exemplified embodiment. The second channel 165 is positioned immediately adjacent to the outer surface 103 of the ceiling plate 151 such that only a very small annular portion of the bottom surface 154 exists between the second channel 165 and the outer surface 103.

Figure 12:
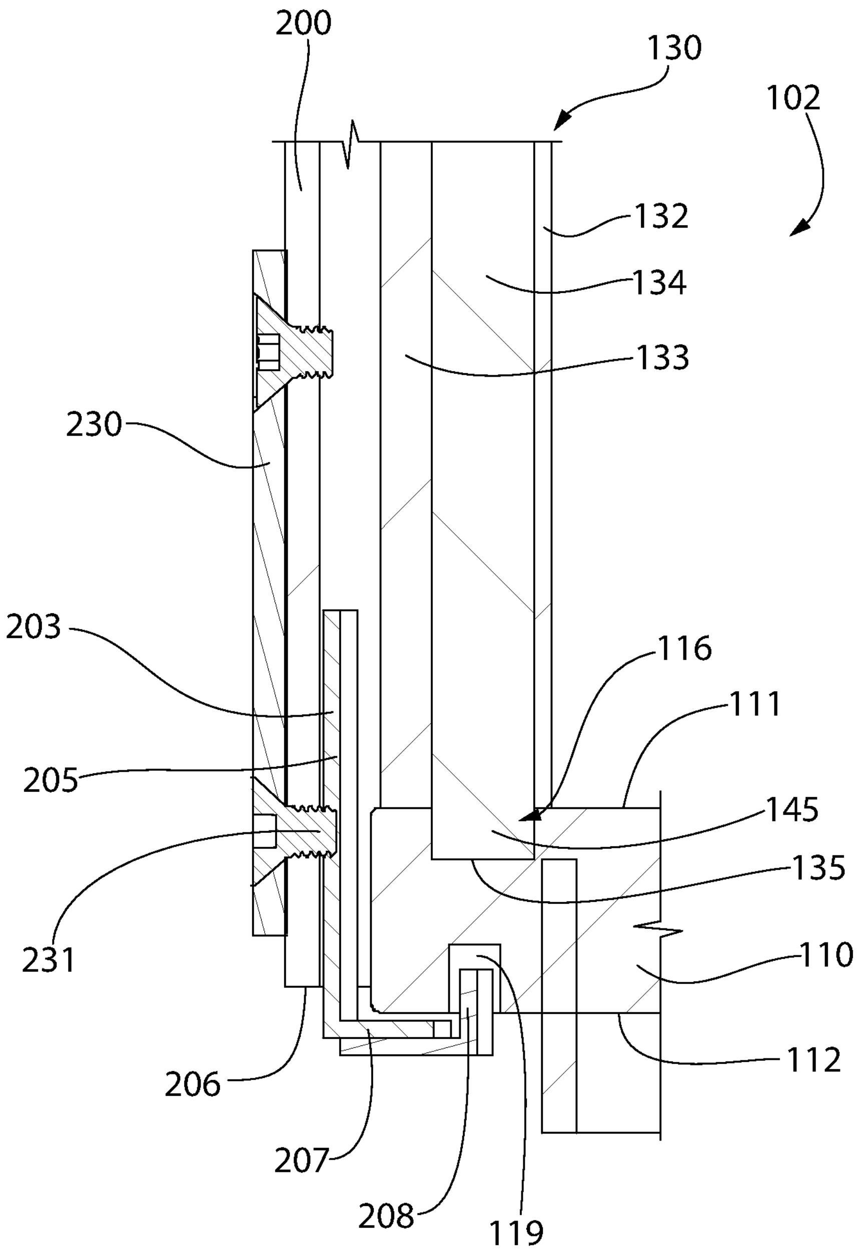
FIG. 12 is a close-up view of area XII of FIG. 9.

Referring to FIGS. 4, 9 and 12, the bottom surface 112 of the floor plate 111 also comprises a peripheral portion 117 that surrounds a central portion 118. Furthermore, a third channel 119 is formed into the bottom surface 112 of the floor plate 111 along the peripheral portion 117. In the exemplified embodiment, the third channel 119 extends approximately 180° along the peripherally portion 117 of the bottom surface 112 of the floor plate 111. The third channel 119 is configured to receive the bracket members 203 of the door 200 as the door 200 is moved between the open and closed states. Thus, the circumferential length of the third channel 119 may be dictated, at least in part, by the amount of movement of the door 200 that is desired. In the exemplified embodiment, a portion of the third channel 119 is aligned with the second portion of the top surface 111 of the floor plate 110 which is devoid of the first channel 116 while another portion of the third channel 119 is aligned with the first channel 116. Thus, the third channel 119 has a part that is not aligned with the first channel 116 and a part that is aligned with the first channel 116, which can be readily seen by viewing FIGS. 3 and 4 concurrently. The ends of the third channel 116 may form a stopper for the door 200 in that the door 200 is prevented from moving beyond the third channel 116 because the bracket members 203 of the door 200 will bump against the ends of the third channel 116.

Figure 11:
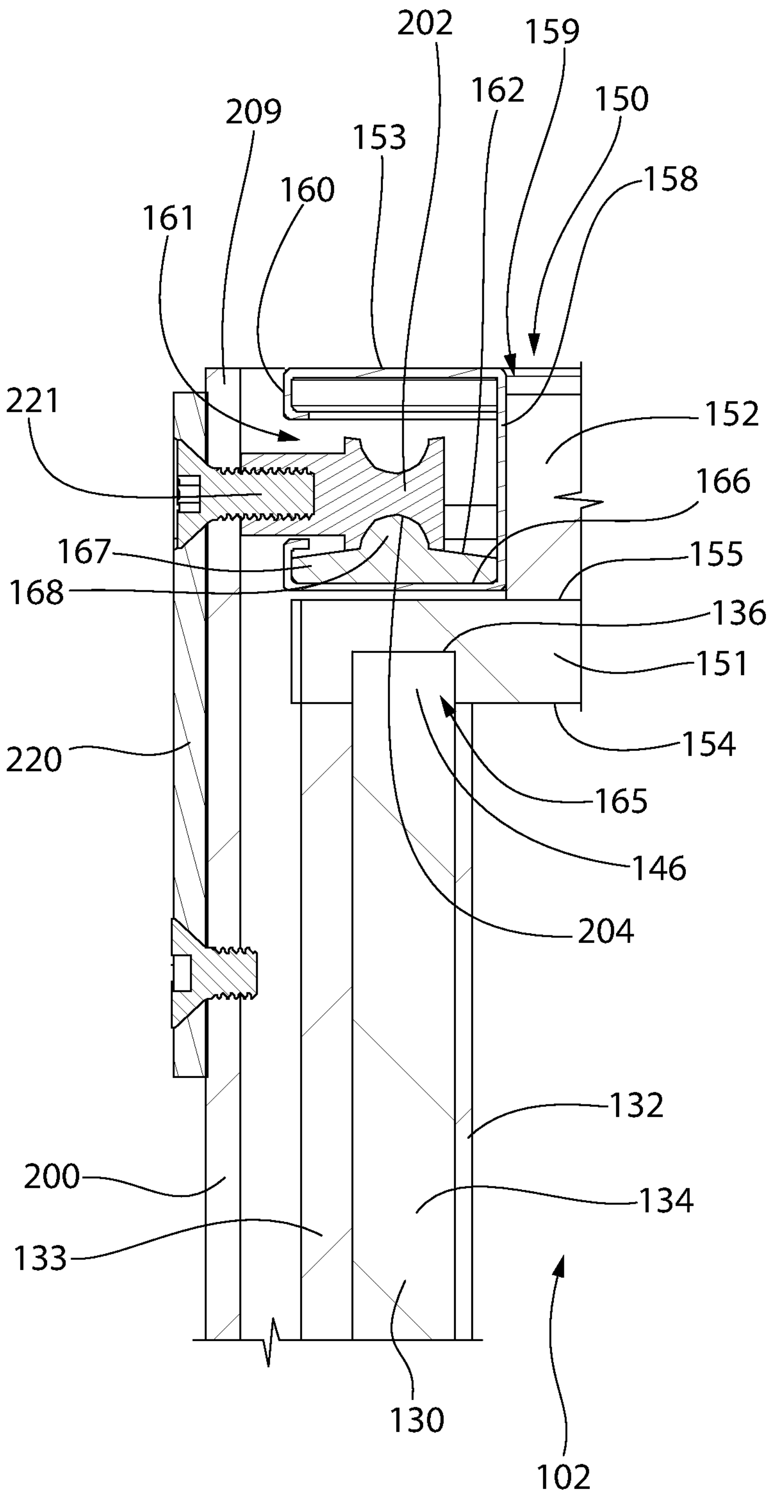
FIG. 11 is a close-up view of area XI of FIG. 9.

Referring to FIGS. 9, 11, and 12, the manner in which the sidewall 130 is supported by the first and second channels 116, 165 will be described. The sidewall 130 is positioned so that a bottom portion 145 of the sidewall 130 that includes the bottom end 135 of the sidewall 130 is disposed within the first channel 116 in the peripheral portion 114 of the top surface 111 of the floor plate 110 (best shown in FIG. 12). In the exemplified embodiment, the bottom portion 145 of the sidewall 130 is formed entirely by the central layer 134 of the sidewall 130. That is, the inner and outer layers 132, 133 of the sidewall 130 are not positioned in the first channel 116, but rather the inner and outer layers 132, 133 terminate in direct abutment with the top surface 111 of the floor plate 110. This is because in the exemplified embodiment the inner and outer layers 132, 133 of the sidewall 130 are formed from wool felt and are not structurally rigid in the sense that they do not form the structural support of the sidewall 130. Of course, in other embodiments the bottom portion 145 of the sidewall 130 may include the inner and outer layers 132, 133 in addition to the central layer 134.

Similarly, the sidewall 130 is positioned so that a top portion 146 of the sidewall 130 that includes the top end 136 of the sidewall 130 is disposed within the second channel 165 in the bottom surface 154 of the ceiling plate 151 (best shown in FIG. 11). As with the bottom portion 145, in the exemplified embodiment the top portion 165 of the sidewall 130 is formed entirely by the central layer 134 of the sidewall 130. That is, the inner and outer layers 132, 133 of the sidewall 130 are not positioned in the second channel 165, but rather the inner and outer layers 132, 133 terminate in direct abutment with the bottom surface 154 of the ceiling plate 151. This is because the inner and outer layers 132, 133 are formed from wool felt in the exemplified embodiment are do not form a structurally supporting component of the sidewall 130. Of course, in other embodiments the top portion 146 of the sidewall 130 may include the inner and outer layers 132, 133 in addition to the central layer 134.

By positioning the top portion 146 of the sidewall 130 into the second channel 165 in the ceiling plate 151 and simultaneously positioning the bottom portion 145 of the sidewall 130 in the first channel 116 in the floor plate 110, the main structural body of the enclosure 110 is fully formed and assembled. The weight of the top plate 151 (and the rest of the ceiling assembly 150) applies a downward force onto the sidewall 130 and holds it in place within the first channel 116. In the exemplified embodiment, the sidewall 130 is not affixed to the floor plate 110 or to the ceiling plate 151 other than via the interaction between the sidewall 130 and the first and second channels 116, 165. Thus, there are no fasteners extending through the floor and ceiling plates 110, 151 and into the sidewall 130 and there is no adhesive, welding, or the like used to affix the sidewall 130 to the floor and ceiling plates 110, 151. This makes for an easy assembly of the enclosure 100. Of course, adhesive, welding, fasteners, or the like could be used in other embodiments to more securely affix the sidewall 130 to the floor and ceiling plates 110, 151 if necessary or desired.

Referring to FIGS. 9 and 11, the arrangement of the components of the ceiling assembly 150, the diffuser plate 310 and the light source 300 will be described. As noted above, the ceiling plate 151 rests directly atop the top end 136 of the sidewall 130. The track member 153 is positioned on the top surface 155 of the ceiling plate 151 along a peripheral portion of the top surface 155 of the ceiling plate 151. The track member 153 is ring-shaped or annular as described above such that it has the inner surface 158 which defines a central through-hole 159. The roof plate 152 is positioned atop of the top surface 155 of the ceiling plate 151 within the central through-hole 159 of the track member 153 so that the track member 153 surrounds the roof plate 152.

The diffuser plate 310 is positioned in the internal cavity 102 such that a top surface 311 of the diffuser plate 310 faces the ceiling plate 151 and a bottom surface 312 of the diffuser plate 310 faces the internal cavity 102. The light source 300 is positioned on the top surface 311 of the diffuser plate 310 but maintained so that a top surface 301 of the light source 300 is spaced apart from the bottom surface 154 of the ceiling plate 151. Thus, a plenum space 305 is formed between the top surface 301 of the light source 300 and the bottom surface 154 of the ceiling plate 151. This allows for proper ventilation of the internal cavity 102. Specifically, fresh air can be pulled into the internal cavity 102 via a gap between a bottom edge of the door 20 and the outer surface 113 of the floor plate 110. The air flows upwardly within the internal space 102 and into the plenum space 305, where the air is pulled out of the internal cavity 102 by the fan device 108. The fan device 108 is disposed within an opening 195 in the roof plate 152 and is aligned with an opening 196 in the ceiling plate 151 such that the opening 196 in the ceiling plate 151 forms a passageway from the fan device 108 to the plenum space 305. The fan device 108 has dimensions that prevent it from fitting into and/or through the opening 196 in the ceiling plate 151. Thus, the fan device 108 rests atop the top surface 155 of the ceiling plate 151 as shown in FIG. 9.

The diffuser plate 310 is coupled to the ceiling assembly 150 with a plurality of fasteners 315. Specifically, the fasteners 315 extend through openings in the diffuser plate 310, openings in the ceiling plate 151, and openings in the roof plate 152 to couple the diffuser plate, the ceiling plate 151, and the roof plate 152 together. Thus, the diffuser plate 310 and the light source 300 are hung from the ceiling assembly 150 and spaced from the ceiling assembly 150 by the plenum space 305. In the exemplified embodiment, the track member 153 is not fastened to the ceiling plate 151 or the roof plate 152 but is held in place by the weight of the door 200 as described above. In other embodiments, the track member 153 may be coupled to the ceiling plate 151 and/or to the roof plate 152 using fasteners, adhesive, or the like.

Referring to FIGS. 9-12, the coupling of the door 200 to the ceiling assembly 150 and to the floor plate 110 will be described. As perhaps best shown in FIG. 9, the door 200 is not coupled to the sidewall 130. In fact, in the exemplified embodiment the door 200 is spaced apart from the sidewall 130 along an entire length of the sidewall 130. Thus, the weight of the door 200 will not apply an outward force onto the sidewall 130 to cause it to become disengaged from the first and second channels 116, 165 as described above. Moreover, the engagement of the door 200 with the ceiling assembly 150 may increase the force being applied onto the top end 136 of the sidewall 130 to more securely retain the sidewall 130 in the first and second channels 116, 165. Specifically, the weight of the door 200 will pull the ceiling plate 151 downwardly onto the top end 136 of the sidewall 130, which will in turn force the sidewall 130 downwardly into the second channel 116.

As noted above, the track member 153 comprises an outer surface 160 that faces the door 200. Furthermore, there is a channel 161 formed into the outer surface 160. The channel 161 has a floor 166. In the exemplified embodiment, a track insert 167 is positioned in the channel 161 and rests atop the floor 166. The track insert 167 comprises a track portion 168 that is configured to interact with the follow members 202 of the door 200 as further described herein. In the exemplified embodiment, the track portion 168 of the track insert 167 is convex or dome-shaped, although it could take on other shapes in other embodiments. It should be appreciated that the track insert 167 could be omitted in some embodiments and the track portion 168 could be formed by the floor 166 of the channel 161.

The follower member 202 is coupled to the door 200 and protrudes from an inner surface of the door 200 that faces the sidewall 130 into the channel 161 of the track member 153. The follower member 202 comprises an engagement portion 204 that interacts with the track portion 168 of the track insert 167. Specifically, the engagement portion 204 of the follower member 202 is concave so that it can rest atop of the convex track portion 168 (in other embodiments the engagement portion 204 could be convex and the track portion 168 could be concave, or these two features could have other complementary shapes to enable them to interact/engage with one another). The follower member 202 may be rotatably coupled to the door 200 so that as the door 200 moves between the open and closes states the follower member 202 rotates as it rides along the track portion 168 of the track insert 167. In other embodiments, the follower member 202 may not rotate but may instead simply slide along the track portion 168 of the track insert 167 as the door 200 is moved between the open and closes states.

Referring to FIGS. 9 and 12, the engagement of the bracket member 203 of the door 200 with the floor plate 110 will be described. As noted above, the bracket member 203 is coupled to the door 202 at a lower end of the door 200. The bracket member 203 comprises a first vertical portion 205 that extends along the door 200 and protrudes from a bottom edge 206 of the door 200, a horizontal portion 207 that extends outwardly from the first vertical portion 205 towards the sidewall 203, and a second vertical portion 208 that extends upwardly from the horizontal portion 207 towards the floor plate 110. More specifically, the second vertical portion 208 of the bracket member 203 protrudes into the third channel 119 formed into the bottom surface 112 of the floor plate 110. As the door 200 moves between the open and closed states, the second vertical portion 208 of the bracket member 203 slides within the third channel 119 in the bottom surface 112 of the floor plate 110. The engagement between the bracket member 203 and the floor plate 110 prevents a bottom portion of the door 200 from being pulled away from the sidewall 200. Thus, the engagement between the follower member 202 and the track 162 and the engagement between the bracket member 203 and the third channel 119 maintains the door 200 in an upright orientation and allows it to move between the open and closed states.

The door 200 has a length measured from the bottom edge 206 to a top edge 209 that is greater than a length of the sidewall 130 measured from the bottom end 135 to the top end 136. Thus, the top edge 209 of the door 200 is located above the top end 136 of the sidewall 130 and the bottom edge 206 of the door 200 is located below the bottom end 135 of the sidewall 130. This is shown in FIGS. 9, 11, and 12. As mentioned above, in the exemplified embodiment the door 200 is entirely spaced apart from the sidewall 130 so that it moves smoothly between the open and closed states. In fact, in the exemplified embodiment the engagement between the follower member 202 and the track 161 is the only contact between the door 200 and the remainder of the enclosure 100. The bracket member 203 is located in the third channel 119 in the floor plate 110, but in its natural state the bracket member 203 is not in contact with the floor plate 110. Of course, the bracket member 203 may be in contact with one of the walls that bounds the third channel 119 in some embodiments.

As shown in FIGS. 5 and 10-12, the follower member 202 is coupled to the door 200 with a first mounting plate 220. Specifically, the first mounting plate 220 is positioned on an outer surface of the door 200 and then coupled to the follower member 202 with a fastener 221. Similarly, the bracket member 203 is coupled to the door 200 with a second mounting plate 220. Specifically, the second mounting plate 220 is positioned on the outer surface of the door 200 and then coupled to the bracket member 203 with a fastener 231. The fasteners 221, 231 extend through the thickness of the door 200 and into the follower member 202 and bracket member 203 respectively.

Figure 13:
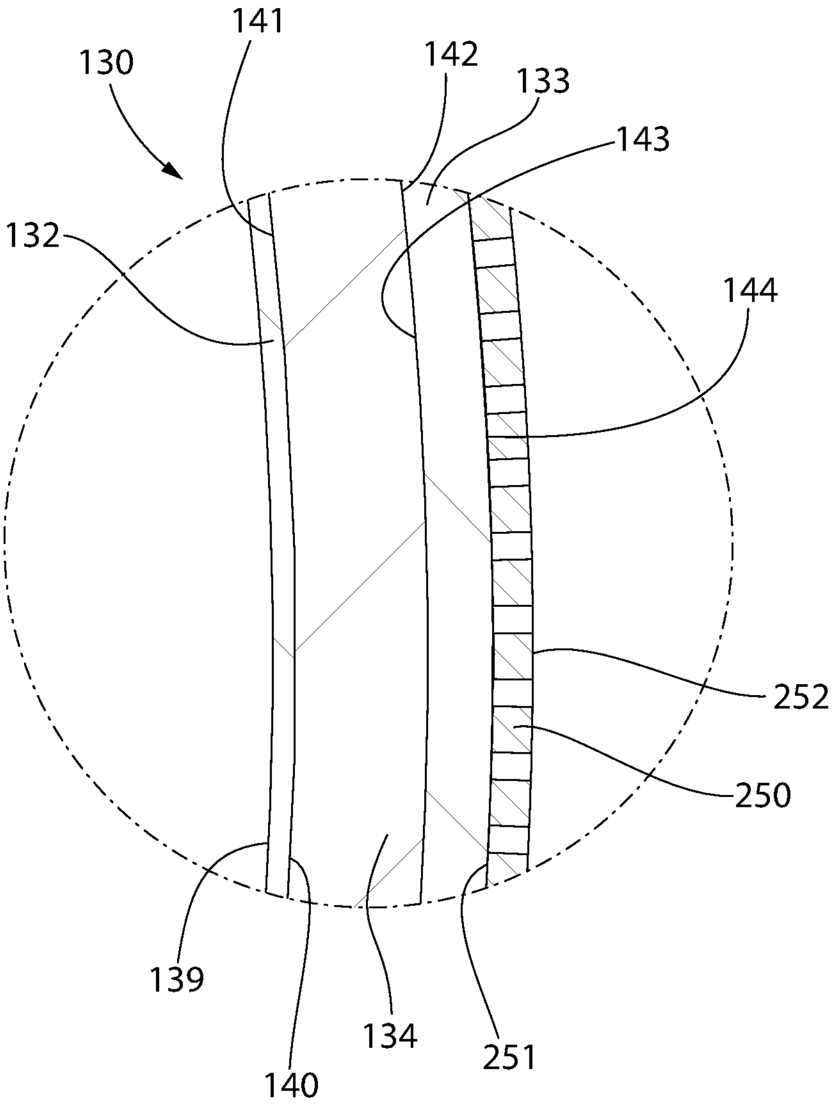
FIG. 13 is a close-up view of FIG. 8 in accordance with an alternative embodiment.

Referring to FIG. 13, an alternative laminate structure for the sidewall 130 is shown. In FIG. 13, the sidewall 130 comprises the inner layer 132, the outer layer 133, and the central layer 134. The description of the inner, outer, and central layers 132-134 provided above is applicable to these same layers in FIG. 13. However, in this embodiment the sidewall 130 also comprises an exterior layer 250. The exterior layer 250 comprises an inner surface 251 that is in surface contact with the outer surface 144 of the outer layer 133 and an outer surface 252 that forms an exposed exterior or outer surface of the sidewall 130. Because the exterior layer 250 forms the exposed outer surface of the sidewall 130, the exterior layer 250 may be selected as a material having a desired aesthetic because it will be the part of the sidewall 130 that is most visible when the enclosure 100 is located within an office space or elsewhere. Thus, the exterior layer 250 may be a metal having a desired texture, it may be plastic having a desired texture, or it may be any other material. In the exemplified embodiment, the exterior layer 250 is wood, which may include any natural wood or engineered wood such as plywood, MDF, three layer boards, or the like.

Figure 13A:
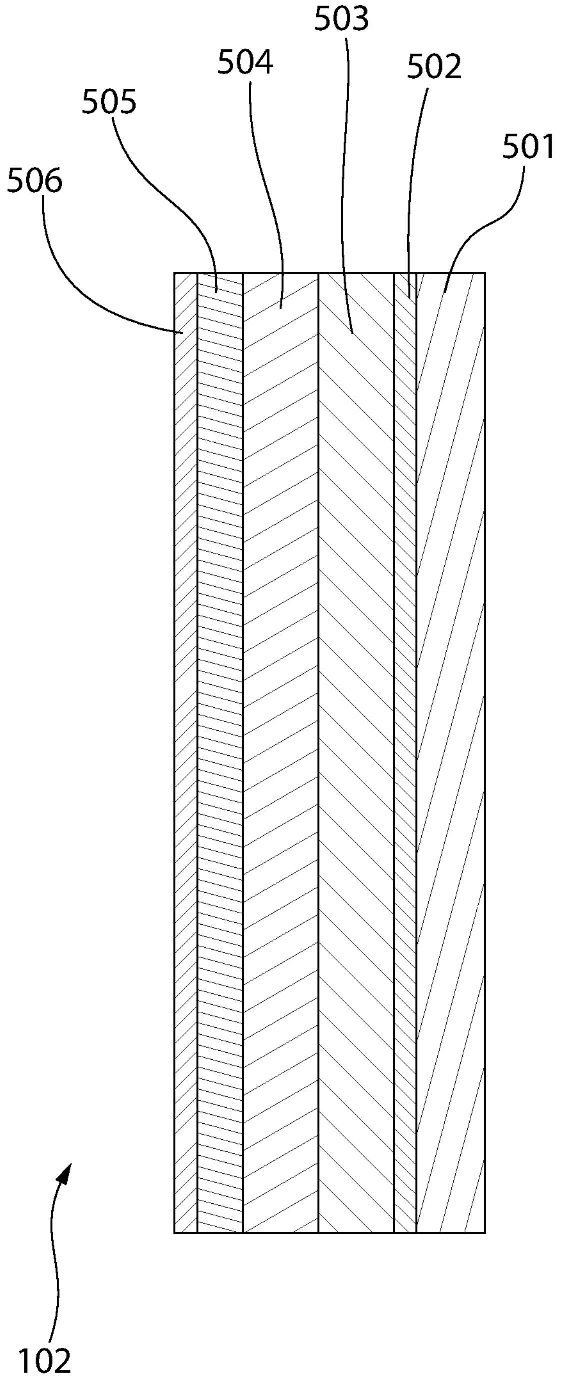
FIG. 13A is a close-up view of FIG. 8 in accordance with another alternative embodiment.

Referring to FIG. 13A, another laminate structure arrangement for the sidewall 130 will be described. In FIG. 13A, the internal cavity 102 is labeled so it is easy to determine which layer forms the inner surface of the sidewall 130 and which layer forms the outer surface of the sidewall 130. In this embodiment, the sidewall 130 comprises, moving from the outermost surface to the innermost surface (with the innermost surface facing the internal cavity 102) a sixth layer 501, a fifth layer 502, a fourth layer 503, a third layer 504, a second layer 505, and a first layer 506. Each layer 501-506 may be in intimate surface contact with the one or two layers to which it is adjacent. It should be appreciated that the numerical prefixes for each of the layers may not be used consistently in the claims as compared to the specification and drawings because the numerical prefix used in the claims depends on claim structure and the point within the claim that each layer is introduced.

Figure 14:
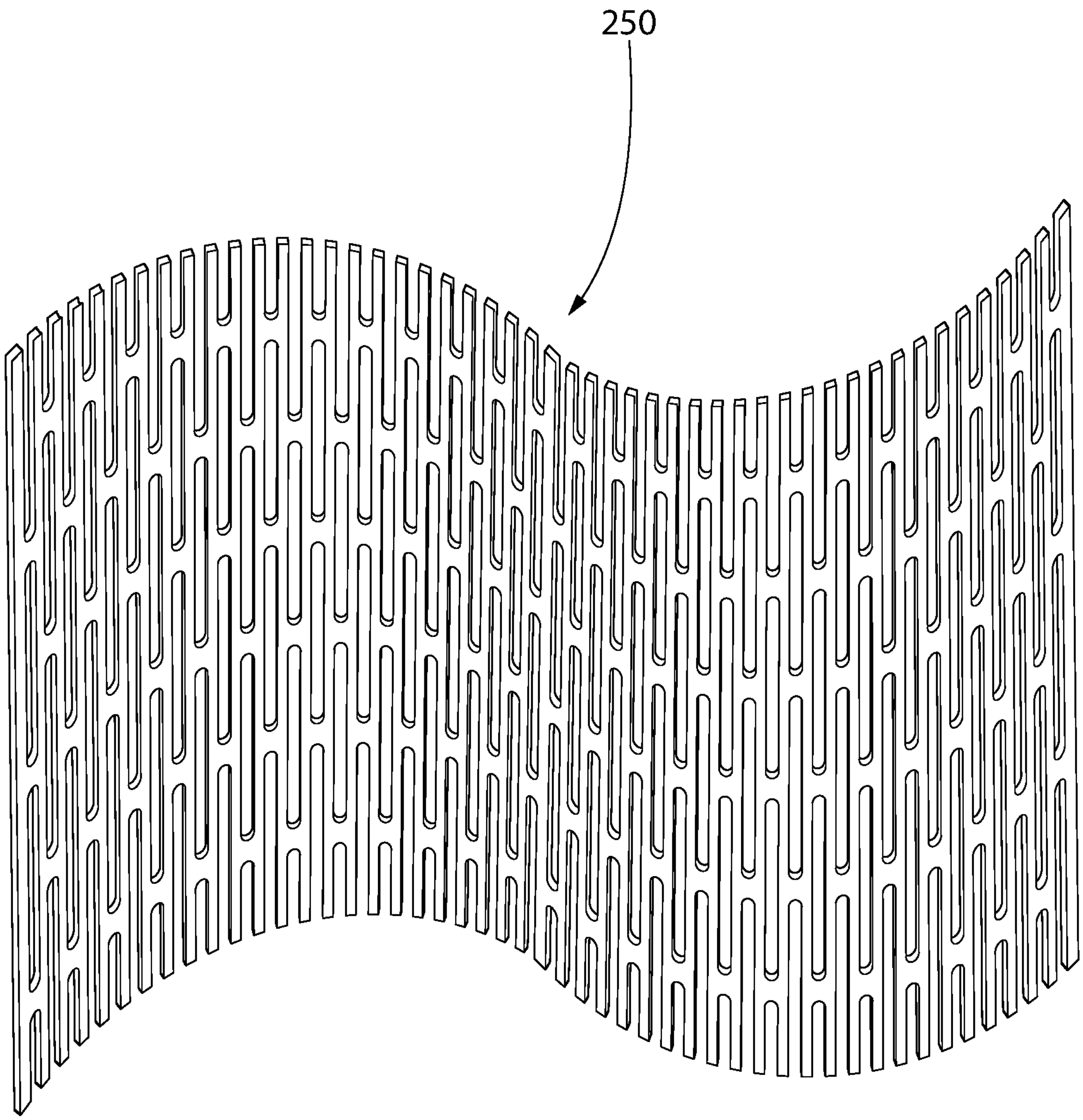
FIG. 14 is a perspective view of an exterior layer of a laminate wall structure shown in FIG. 13.

In this embodiment, the sixth layer 501 may be formed from a flexible wood product, such as Dukta wood, an example of which is shown in FIG. 14 and described below. The sixth layer 501 may be formed from a flexible organic material in some embodiments. In some embodiments, the flexible organic material may comprise a cellulosic material. In other embodiments the flexible organic material may comprise wood. The sixth layer 501 may be a flexible organic material having an incision pattern thereon, as described in greater detail below.

The sixth layer 501 may have a thickness of between 8 mm and 10 mm, and more specifically approximately 9 mm. The fifth layer 502 may be formed from felt, such as 100% wool felt. The fifth layer 502 may have a thickness of between 2 mm and 4 mm, and more specifically approximately 3 mm. The fourth layer 503 may be plywood. For example, the fourth layer 503 may be a layer of bending plywood having a thickness of approximately between 8 mm and 12 mm, and more specifically approximately 9.5 mm. The third layer 504 may be identical to the fourth layer 503. Thus, the third layer 504 may be another layer of bending plywood having a thickness between 8 mm and 12 mm, and more specifically approximately 9.5 mm. In some embodiments, the third and fourth layers 503, 504 may be combined and formed from a single layer of bending plywood having a thickness between 16 mm and 24 mm, and more specifically approximately 19 mm. The second layer 505 may be an acoustic board. The second layer 505 may have a thickness between 4 mm and 8 mm, and more specifically approximately 6 mm. Finally, the first layer 506 may be formed from felt, such as 100% wool felt. The first layer 506 may have a thickness of between 2 mm and 4 mm, and more specifically approximately 3 mm.

The sixth layer 501 may be coupled to the fourth layer 503 through the fifth layer 502 using staples (¼" crown staples, for example), the fifth layer 502 may be coupled to the fourth layer 503 using liquid nails, the fourth layer 503 may be coupled to the third layer 504 using wood glue, the third layer 504 may be coupled to the second layer 505 using liquid nails, and the second layer 505 may be coupled to the first layer 506 using adhesive (e.g., Simalfa 309 adhesive). As can be seen in FIG. 13A, there are no air gaps in the laminate structure of the sidewall 130. Rather, each layer is in intimate surface contact with the one or two layers that is/are adjacent to that layer.

Referring to FIGS. 13 and 14 concurrently, in the exemplified embodiment the exterior layer 250 is a flexible wood material. Specifically, the exterior layer 250 is formed from wood having an incision pattern therein that enables the wood to be flexible. An example of a type of material that can be used are the flexible wood products sold by Dukta®. The wood may be incised on one or both sides depending on the degree of flexibility needed. In the exemplified embodiment, the incision pattern includes through-holes that extend through the exterior layer 250 from the inner surface 251 to the outer surface 252. One incision pattern is shown in FIG. 14, but it should be appreciated that many different incision patterns could be used to render the exterior layer 250 flexible so that it can curve in the shape of the sidewall 130 as shown and described herein.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A privacy enclosure comprising:

a floor plate having a top surface that forms a floor of an interior cavity of an enclosure, a bottom surface opposite the top surface, and an outer surface extending between the top and bottom surfaces, the top surface comprising a peripheral portion adjacent to the outer surface, a first channel formed into the top surface of the floor plate along the peripheral portion of the top surface;

a ceiling assembly comprising a ceiling plate having a bottom surface that forms a ceiling of the interior cavity of the enclosure, a top surface opposite the bottom surface, and an outer surface extending between the top and bottom surfaces, the bottom surface comprising a peripheral portion adjacent to the outer surface, a second channel formed into the bottom surface of the ceiling plate along the peripheral portion of the bottom surface;

a sidewall extending from a bottom end to a top end along a longitudinal axis, a bottom portion of the sidewall that comprises the bottom end disposed within the first channel of the floor plate and a top portion of the sidewall that comprises the top end disposed within the second channel of the ceiling plate so that the floor plate, the ceiling plate, and the sidewall collectively define a boundary of the interior cavity of the enclosure, the sidewall comprising a first end and a second end that are elongated in a direction of the longitudinal axis and are spaced apart from one another to define an opening into the interior cavity of the enclosure;

a door alterable between an open state wherein the door does not close the opening and a closed state wherein the door closes the opening; and wherein the first channel is located along a first portion of the peripheral portion of the top surface of the floor plate, a second portion of the peripheral portion of the top surface of the floor plate being devoid of the first channel, and wherein the second channel is located along a first portion of the peripheral portion of the bottom surface of the ceiling plate, a second portion of the peripheral portion of the bottom surface of the ceiling plate being devoid of the first channel, and wherein the second portion of the peripheral portion of the top surface of the floor plate and the second portion of the peripheral portion of the bottom surface of the ceiling plate are aligned with the opening.

2. The privacy enclosure according to claim 1 wherein the enclosure formed by the floor plate, the ceiling plate, the sidewall, and the door is cylindrical shaped, the floor plate and the ceiling plate being round and the sidewall being arcuate.

3. The privacy enclosure according to claim 1 wherein the ceiling assembly comprises a track and the door comprises a follower member that slides along the track as the door is altered between the open and closed states.

4. The privacy enclosure according to claim 1 wherein the sidewall comprises an inner surface, and further comprising a shelf coupled to the inner surface of the sidewall and extending into the enclosure.

5. The privacy enclosure according to claim 1 wherein the door is coupled to the ceiling assembly and to the floor plate, and wherein the door is spaced apart from the sidewall such that the door is not coupled directly to the sidewall.

6. The privacy enclosure according to claim 1 wherein the sidewall comprises a laminate structure comprising an inner layer that forms an inner surface of the sidewall, an outer layer, and a central layer disposed between the inner and outer layers, wherein the inner and outer layers are formed from wool felt and the central layer is formed from a rigid material.

7. The privacy enclosure according to claim 6 wherein the laminate structure further comprises an exterior layer positioned adjacent to the outer layer, the exterior layer forming an outer surface of the sidewall, wherein the exterior layer comprises a flexible wood material comprising an incision pattern that enables the exterior layer to bend into an arcuate shape.

8. The privacy enclosure according to claim 1 further comprising a light source coupled to the ceiling assembly and located within the interior cavity of the enclosure, wherein an upper surface of the light source is spaced apart from the bottom surface of the ceiling plate to define a plenum space, and further comprising a fan device located within the ceiling assembly for pulling air into the plenum space and out of the interior cavity of the enclosure.

9. The privacy enclosure according to claim 1 wherein the door extends from a bottom end to a top end, the door having a length measured between the bottom and top ends that is greater than a length of the sidewall measured between the bottom and top ends, and wherein the top end of the door is located above the top end of the sidewall and the bottom end of the door is located below the bottom end of the sidewall.

10. A privacy enclosure comprising:

a floor plate having a top surface that forms a floor of an interior cavity of an enclosure, a bottom surface opposite the top surface, and an outer surface extending between the top and bottom surfaces, the top surface-comprising a peripheral portion adjacent to the outer surface, a first channel formed into the top surface of the floor plate along the peripheral portion of the top surface;

a ceiling assembly comprising a ceiling plate having a bottom surface that forms a ceiling of the interior cavity of the enclosure, a top surface opposite the bottom surface, and an outer surface extending between the top andbottom surfaces, the bottom surface comprising a peripheral portion adjacent to the outer surface, a second channel formed into the bottom surface of the ceiling plate along the peripheral portion of the bottom surface;

a sidewall extending from a bottom end to a top end along a longitudinal axis, a bottom portion of the sidewall that comprises the bottom end disposed within the first channel of the floor plate and a top portion of the sidewall that comprises the top end disposed within the second channel of the ceiling plate so that the floor plate, the ceiling plate, and the sidewall collectively define a boundary of the interior cavity of the enclosure, the sidewall comprising a first end and a second end that are elongated in a direction of the longitudinal axis and are spaced apart from one another to define an opening into the interior cavity of the enclosure;

a door alterable between an open state wherein the door does not close the opening and a closed state wherein the door closes the opening;

wherein the bottom surface of the floor plate comprises a peripheral portion adjacent to the outer surface of the floor plate, a third channel formed into the bottom surface of the floor plate along the peripheral portion of the bottom surface of the floor plate, and wherein the door comprises a bracket member that slides within the third channel as the door is altered between the open and closed states.

11. A privacy enclosure comprising:

a floor plate having a top surface that forms a floor of an interior cavity of an enclosure, a bottom surface opposite the top surface, and an outer surface extending between the top and bottom surfaces, the top surface comprising a peripheral portion adjacent to the outer surface, a first channel formed into the top surface of the floor plate along the peripheral portion of the top surface;

a ceiling assembly comprising a ceiling plate having a bottom surface that forms a ceiling of the interior cavity of the enclosure, a top surface opposite the bottom surface, and an outer surface extending between the top and bottom surfaces, the bottom surface comprising a peripheral portion adjacent to the outer surface, a second channel formed into the bottom surface of the ceiling plate along the peripheral portion of the bottom surface;

a sidewall extending from a bottom end to a top end along a longitudinal axis, a bottom portion of the sidewall that comprises the bottom end disposed within the first channel of the floor plate and a top portion of the sidewall that comprises the top end disposed within the second channel of the ceiling plate so that the floor plate, the ceiling plate, and the sidewall collectively define a boundary of the interior cavity of the enclosure, the sidewall comprising a first end and a second end that are elongated in a direction of the longitudinal axis and are spaced apart from one another to define an opening into the interior cavity of the enclosure;

a door alterable between an open state wherein the door does not close the opening and a closed state wherein the door closes the opening;

wherein the ceiling assembly comprises:

a track and the door comprises a follower member that slides along the track as the door is altered between the open and closed states a ring-shaped track member positioned atop of the top surface of the ceiling plate, the ring-shaped track member comprising an outer surface, wherein an annular channel is formed into the outer surface of the ring-shaped track member, the track being located within the annular channel; and a roof plate disposed within a through-hole of the ring-shaped track member and resting atop of the top surface of the ceiling plate, wherein the ring-shaped track member surrounds the roof plate, and wherein the ceiling plate and the roof plate are coupled together with one or more fasteners.

12. A privacy enclosure comprising:

a floor plate having a top surface that forms a floor of an interior cavity of an enclosure, a bottom surface opposite the top surface, and an outer surface extending between the top and bottom surfaces, the top surface comprising a peripheral portion adjacent to the outer surface, a first channel formed into the top surface of the floor plate along the peripheral portion of the top surface;

a ceiling assembly comprising a ceiling plate having a bottom surface that forms a ceiling of the interior cavity of the enclosure, a top surface opposite the bottom surface, and an outer surface extending between the top and bottom surfaces, the bottom surface comprising a peripheral portion adjacent to the outer surface, a second channel formed into the bottom surface of the ceiling plate along the peripheral portion of the bottom surface;

a sidewall extending from a bottom end to a top end along a longitudinal axis, a bottom portion of the sidewall that comprises the bottom end disposed within the first channel of the floor plate and a top portion of the sidewall that comprises the top end disposed within the second channel of the ceiling plate so that the floor plate, the ceiling plate, and the sidewall collectively define a boundary of the interior cavity of the enclosure, the sidewall comprising a first end and a second end that are elongated in a direction of the longitudinal axis and are spaced apart from one another to define an opening into the interior cavity of the enclosure;

a door alterable between an open state wherein the door does not close the opening and a closed state wherein the door closes the opening;

wherein the sidewall comprises a laminate structure comprising an inner layer that forms an inner surface of the sidewall, an outer layer, and a central layer disposed between the inner and outer layers, wherein the inner and outer layers are formed from wool felt and the central layer is formed from a rigid material; and wherein the bottom and top portions of the sidewall that are disposed within the first and second channels, respectively, are formed solely by the central layer of the sidewall such that the inner and outer layers of the sidewall are affixed to the central layer and do not extend into the first and second channels.

13. A privacy enclosure comprising:

a floor plate having a top surface that forms a floor of an interior cavity of an enclosure, a bottom surface opposite the top surface, and an outer surface extending between the top and bottom surfaces, the bottom surface comprising a peripheral portion adjacent to the outer surface, a first channel formed into the bottom surface of the floor plate along the peripheral portion of the bottom surface of the floor plate;

a ceiling assembly comprising a ceiling plate that forms a ceiling of the interior cavity and a ring-shaped track member positioned atop of the ceiling plate, the ring-shaped track member comprising an outer surface, a channel formed into the outer surface of the ring-shaped track, and a track located within the channel;

a sidewall coupled to the floor plate and to the ceiling plate, an opening in the sidewall forming a passageway into the interior cavity of the enclosure; and a door comprising a follower member positioned within the channel of the ring-shaped track member in engagement with the track and a bracket member positioned within the first channel in the peripheral portion of the bottom surface of the floor plate, and wherein the door is alterable between an open state wherein the passageway is exposed and a closed state wherein the door closes the passageway, and wherein altering the door between the open and closed states causes the follower member to slide along the track and the bracket member to slide within the first channel.

14. The privacy booth according to claim 13 wherein the floor plate and the ceiling plate are round and wherein the privacy enclosure is cylindrical.

15. The privacy booth according to claim 13 wherein the ceiling system further comprises a roof plate that is positioned atop of the ceiling plate, and wherein the ring-shaped track member surrounds the roof plate such that the roof plate is positioned within a through-hole of the ring-shaped track member.

16. The privacy booth according to claim 13 wherein the top surface of the floor plate comprises a peripheral portion adjacent to the outer surface, a second channel formed into the top surface of the floor plate along the peripheral portion of the top surface of the floor plate, the second channel being at least partially aligned with the first channel, and wherein a bottom portion of the sidewall is located within the second channel to couple the sidewall to the floor plate.

17. The privacy booth according to claim 16 wherein the ceiling plate comprises a bottom surface that faces the interior cavity of the enclosure, the bottom surface of the ceiling plate comprising a peripheral portion, a third channel formed into the bottom surface of the ceiling plate along the peripheral portion of the bottom surface of the ceiling plate, and wherein a top portion of the sidewall is located within the third channel to couple the sidewall to the ceiling plate, wherein the sidewall comprises a laminate structure comprising an inner layer that forms an inner surface of the sidewall, an outer layer, and a central layer disposed between the inner and outer layers, and wherein the central layer is positioned in the second channel of the floor plate and the third channel of the ceiling plate, and wherein the inner and outer layers are not positioned in either the second channel of the floor plate or the third channel of the ceiling plate, wherein the inner and outer layers are formed from wool felt and the central layer is formed from a rigid material, wherein the inner layer has a thickness between 3 mm and 4 mm, wherein the outer layer has a thickness between 8 mm and 12 mm, and wherein the central layer has a thickness between 15 mm and 25 mm.

18. The privacy booth according to claim 16 wherein a first portion of the peripheral portion of the top surface of the floor plate comprises the second channel and a second portion of the peripheral portion of the top surface of the floor plate is devoid of any channel, and wherein a first portion of the first channel in the bottom surface of the floor plate is aligned with the first portion of the peripheral portion of the top surface of the floor plate and a second portion of the first channel in the bottom surface of the floor plate is aligned with the second portion of the peripheral portion of the top surface of the floor plate.

* * * * *